US007130853B2

(12) United States Patent
Roller et al.

(10) Patent No.: US 7,130,853 B2
(45) Date of Patent: Oct. 31, 2006

(54) DATAMART INCLUDING ROUTINES FOR EXTRACTION, ACCESSING, ANALYZING, TRANSFORMATION OF DATA INTO STANDARDIZED FORMAT MODELED ON STAR SCHEMA

(75) Inventors: Keith Roller, Flower Mound, TX (US); William Johnson, Summerfield, NC (US); Patrick J. Handerhan, Longmont, CO (US)

(73) Assignee: Fair Isaac Corporation, Minneapolis, MN (US)

( * ) Notice: Subject to any disclaimer, the term of this patent is extended or adjusted under 35 U.S.C. 154(b) by 1211 days.

(21) Appl. No.: 09/874,817

(22) Filed: Jun. 5, 2001

(65) Prior Publication Data

US 2002/0035562 A1 Mar. 21, 2002

Related U.S. Application Data

(60) Provisional application No. 60/209,494, filed on Jun. 6, 2000.

(51) Int. Cl.
*G06F 17/30* (2006.01)

(52) U.S. Cl. .......................... 707/10; 707/1; 707/104.1

(58) Field of Classification Search ................ 707/1–5, 707/100–104.1, 9–10; 705/1–3, 10, 26–27
See application file for complete search history.

(56) References Cited

U.S. PATENT DOCUMENTS

| | | | | |
|---|---|---|---|---|
| 5,701,453 A | * | 12/1997 | Maloney et al. ................ 707/2 |
| 5,819,086 A | * | 10/1998 | Kroenke ...................... 707/102 |
| 5,987,108 A | * | 11/1999 | Jagadish et al. ........ 379/114.01 |
| 6,058,391 A | * | 5/2000 | Gardner .......................... 707/4 |
| 6,182,060 B1 | * | 1/2001 | Hedgcock et al. .............. 707/1 |
| 6,189,004 B1 | * | 2/2001 | Rassen et al. .................. 707/3 |
| 6,389,126 B1 | * | 5/2002 | Bjornberg et al. ...... 379/201.03 |
| 6,411,961 B1 | * | 6/2002 | Chen .......................... 707/102 |
| 6,480,850 B1 | * | 11/2002 | Veldhuisen .................... 707/9 |
| 6,611,498 B1 | * | 8/2003 | Baker et al. ................. 370/252 |
| 6,615,258 B1 | * | 9/2003 | Barry et al. ................. 709/223 |
| 6,618,729 B1 | * | 9/2003 | Bhashyam et al. ......... 707/101 |
| 6,668,253 B1 | * | 12/2003 | Thompson et al. ........... 707/10 |
| 6,748,394 B1 | * | 6/2004 | Shah et al. ................. 707/102 |
| 6,753,889 B1 | * | 6/2004 | Najmi ........................ 345/784 |
| 2003/0217079 A1 | * | 11/2003 | Bakalash et al. ........... 707/200 |

FOREIGN PATENT DOCUMENTS

| EP | 1158436 A1 | * | 11/2001 | .................... 17/60 |
|---|---|---|---|---|
| WO | WO 98/50868 | * | 11/1998 | .................... 17/30 |
| WO | WO 00/42553 | * | 7/2000 | .................... 17/60 |

OTHER PUBLICATIONS

Michael K et al., The translation of star schema into entity-relationaship diagrams, DEXa workshop, 1997, pp. 1-28.*

(Continued)

*Primary Examiner*—Srirama Channavajjala
(74) *Attorney, Agent, or Firm*—Michael A. Glenn; Glenn Patent Group

(57) ABSTRACT

Disclosed is a data collection and analysis system that is capable of extracting data from various disparate sources, i.e., contact channels, storing the data and analyzing the data to show trends in the business operation. The data is stored in a data model that uses a star schema approach to providing a unified data source. Analyzed data can be made available to users on a nearly real time basis that allows the users to view trends in business operation and plan accordingly.

3 Claims, 38 Drawing Sheets

OTHER PUBLICATIONS

Thomas S et al. "An integrative and uniform model for metadata management in data warehousing environments", proceedings of the international workshop on design and management of data warehouses, 1999 pp. 12-1 : 12-16.*

Trillium Software system, whitepaper EN, "Achieving enterprise wide data quality: A practical guide to achieving enterprise data quality", 1999-2000, pp. 1-19.*

Nils Madeja et al. "Impact of electronic commerce customer relationship management on corporate success-results from an empirical investigation", proceedings of the 36th Hawaii international conference on system sciences, IEEE, 2002, pp. 10 pages.*

Russell S Winer, "customer relationship management: A framework, research directions, and the future", Apr. 2001,pp. 1-33.*

Detlef Schoder et al. "Is customer relationship management a success factor in electronic commerce?", Journal of electronic commerce research, vol. 5, No. 2004, pp. 38-53.*

Belinda Weaver, Customer relationship management—your biggest brother?, Online currents—vol. 17, No.(3), Apr. 2002, pp. 4-8.*

* cited by examiner

DATAMART INCLUDING ROUTINES FOR EXTRACTION, ACCESSING, ANALYZING, TRANSFORMATION OF DATA INTO STANDARDIZED FORMAT MODELED ON STAR SCHEMA

CROSS REFERENCE TO RELATED APPLICATIONS

This application claims the benefit of U.S. Provisional Application No. 60/209,494, filed Jun. 6, 2000.

BACKGROUND OF THE INVENTION

A. Field of the Invention

The present invention pertains to database systems in general and more particularly to databases that integrate information regarding communications with business enterprises, efficiently sorting and storing such information as well as accessing and reporting such information in a variety of report formats.

B. Background of the Invention

Present day packaged database applications are somewhat limited in their ability to integrate business contact functions. For example, common customer relationships management (CRM) software systems are able to provide some business analytics for single channels through which outside contacts communicate with the business (contact channels). However, such common CRM software systems are incapable of providing an integrated database system that is capable of analyzing data unified across a number of different contact channels. In other words, integration of a series of different databases for different contact channels to provide an overall view of the integrated business contact system such that analytics can be applied to that overall system has not previously been offered as a packaged application.

Typical CRM applications will allow the user to perform case management and tracking of customer preferences. Typically a customer may wish to contact a customer support center, for example, to report a problem they are having with a particular product that they have purchased. For example, a customer may report a problem with a washing machine or some software they have purchased. The customer typically calls to a customer support center that then prepares a ticket that includes a case number. The case number is then tracked by the CRM application. When the customer calls in again, the support organization can identify the customer and track the status of the repair. Similarly, when a customer calls a sales organization they may be inquiring about a purchase they have made. The customer is given a purchase number to identify that customer. When the customer calls in again, information regarding the previous purchases of that customer is provided to the sales attendant. Some CRM applications and supporting software are capable of analyzing customer purchases to develop insights into customer purchasing habits and likely purchase preferences. Hence, typical CRM applications are somewhat limited in the information that they can provide.

In the contemporary economy, businesses have many different contact channels. For example, a business may have an automatic call distributor (ACD) that is used with an interactive voice response (IVR) system to direct customers to particular customer service representatives that have expertise in a particular area. Further, the business may have a web page which allows customers to enter into interactive sessions on the web page and learn more information about products and support issues. Further, email can be used by businesses to contact customers and for customers to contact the business regarding both sales and support issues.

Applicant is unaware of any existing system other than the invention herein claimed that can integrate the data that is generated by each of these different contact channels, including the customer relationships management channel, to perform business analytics and determine the success of any particular product, the efficiency of customer support, and similar issues.

SUMMARY OF THE INVENTION

The present invention overcomes the disadvantages and limitations of the prior art by providing an integrated system that is capable of mandating the collection of data from multiple, disparate contact source systems (i.e., contact channels), extracting the mandated data, and storing the extracted data in a data model that allows the data to be analyzed across all of the different contact channels, thus unifying operational CRM data and the contact channel transaction processing systems.

The present invention may therefore comprise a computer implemented system for processing and managing data generated by a plurality of customer communications received by a business through a plurality of diverse business communication channels, each communication channel comprising a computerized system including an interface for communication with individual or business entity customers and a records database for recording information concerning communications with individual or business entity customers, the system including: a configuration component for instancing, in each of the records databases, specifications for data associated with each event involving a customer communication; an extractor routine communicatively coupled with each of the contact records databases, the extractor routine extracts data concerning each event involving a customer communication from each of the contact records databases; a transform routine communicatively coupled with the extractor routine, the transform routine receives data extracted by the extractor routine and transforms the data extracted by the extractor routine into data formatted according to an analysis protocol independent of protocols of the records databases; a central database communicatively coupled with the transform routine, the central database is specially modeled on star schema, the central database receives and stores data transformed by the transform routine, storing the data in a specially modeled star schema; and an analysis server communicatively coupled with the central database, the analysis server accesses and synthesizes the data in response to inquiries concerning customer communication events and generates reports of the synthesis.

The present invention may further comprise a method in a computer system including routines for extraction of source data from a communication contact system, transformation of the data into a standardized format, loading the data in standardized format into a dynamic storage medium, and accessing the data in standardized format for purposes of analysis comprising: defining specifications for data; imposing the specifications on one or more communication contact systems; collecting in the communication contact systems, data complying with the specifications; extracting from each of the communication contact system all data complying with the specifications; transforming all extracted data to transformed data in a standardized format;

storing all transformed data in defined logical tables in a single database; accessing the transformed data from the single database; processing the transformed data according to inquiries by end users; transmitting the results of the processing to end users.

An advantage of the present invention is that users of the system can use data analysis to identify critical trends in the performance of their business. For example, if a business suddenly recognizes a migration of contacts from e-mail to web contacts, the business can dynamically begin to manage the manner in which the business accommodates web contacts. In addition, the present invention adapts the campaign management functions of its software in response to the analyzed unified data to develop campaigns that follow business trends. Further, the present invention enables users of this system to obtain virtually instantaneous access to customer contact information and can show trends in real time so that the company can adapt quickly to business trends, rather than rely on tedious and slow prior art methods of analyzing data.

DETAILED DESCRIPTION OF THE PRESENT INVENTION

It will be appreciated that the invention may vary as to configuration and as to details of the parts without departing from the basic concepts as disclosed herein.

Figure 1:
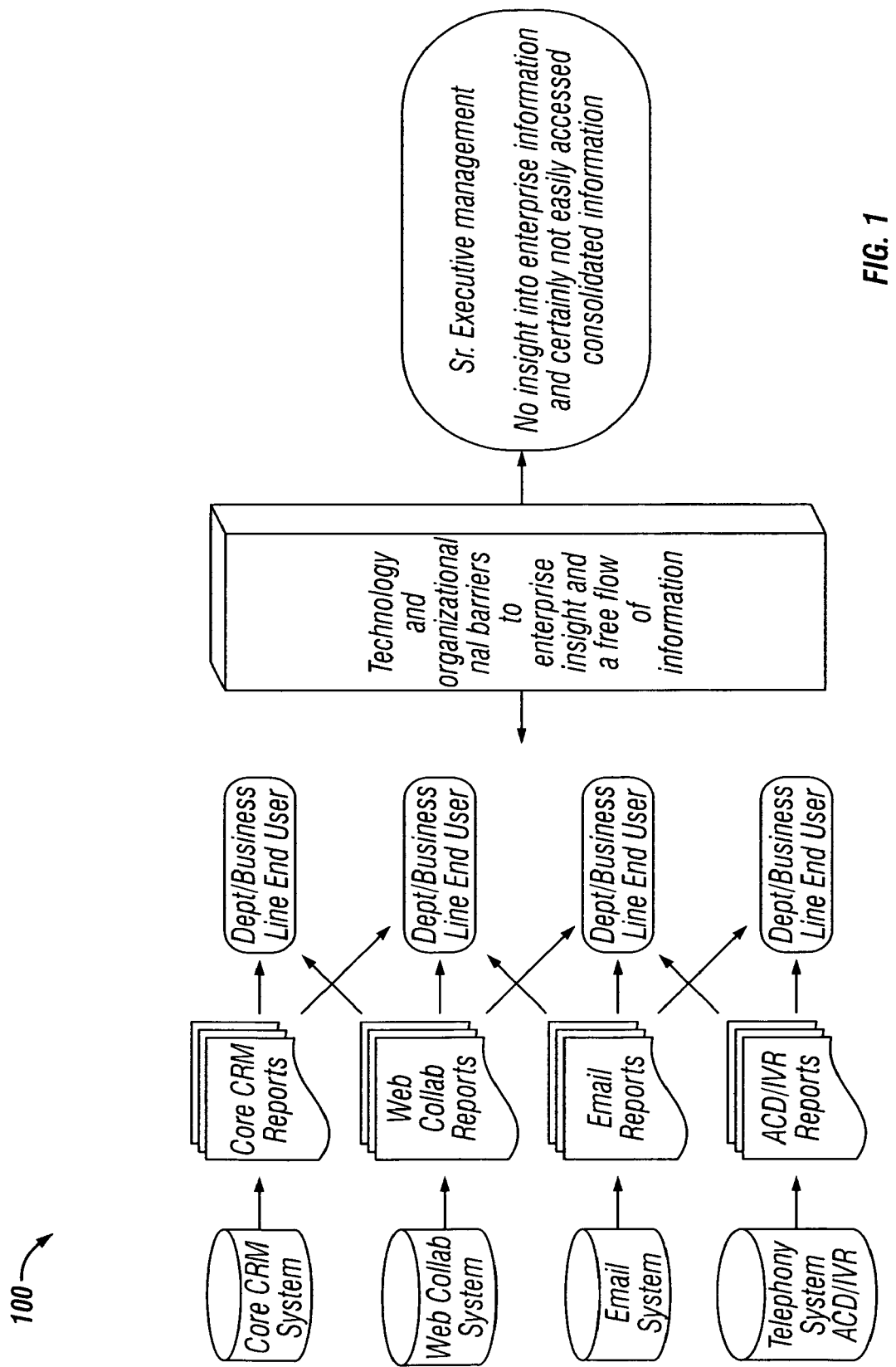
FIG. 1 is a schematic block diagram of the overall flow of information in a commercial enterprise.

FIG. 1 is a schematic block diagram of the overall flow of information in a typical commercial enterprise. Each system has separate reporting. By necessity, business analysts are frequently employed to combine appropriate data as shown at 100 in order to obtain an overall view and understanding of what transactions are occurring.

Figure 2:
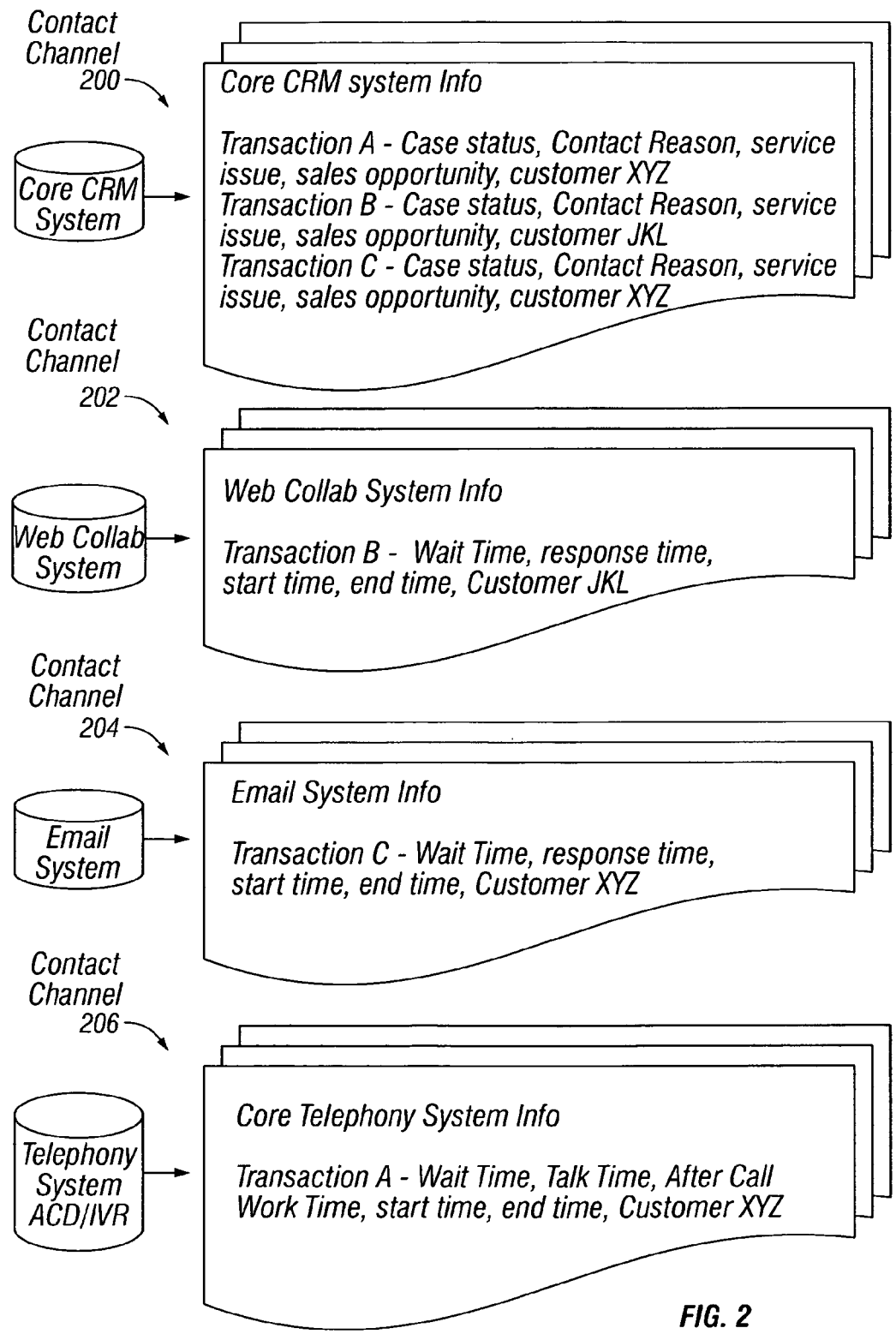
FIG. 2 is a schematic block diagram of the overall flow of data in a data processing system, for processing business contact information from multiple contact channels.

FIG. 2 is a schematic block diagram of the overall flow of data in a typical data processing system for processing business contact information from multiple contact channels 200, 202, 204, 206. Such a system provides no easy way to show a consolidated view of what customers using different contact channels experienced during the course of their interactions with the company, i.e., how long did they wait for service or sales support for each contact channel. No easy means exits to provide a view across contact channels about how customers are contacting the company and the results of each contact.

Data generated by business enterprises that are structured as reflected in FIGS. 1 and 2, remains segregated in discreet storage mediums that are usually not compatible. Such segregation confounds efforts by such enterprises to achieve a unified view of contact operations. Such segregation also seriously complicates such enterprises' abilities to manage efficiently their contact operations.

Figure 3:
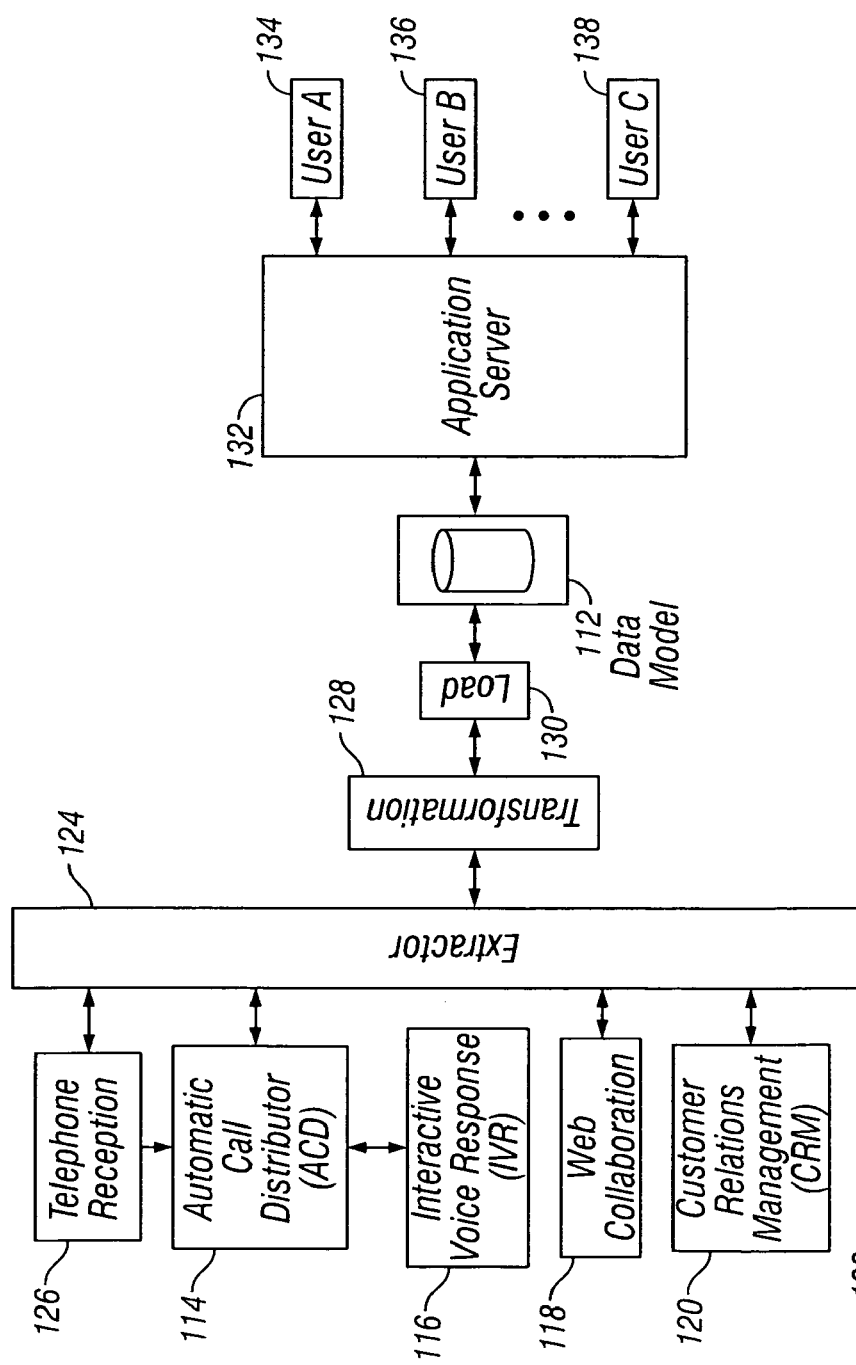
FIG. 3 is a schematic block diagram of the overall flow of data in a data processing system, that employs the present invention, for processing business contact information from multiple contact channels.

FIG. 3 is a schematic block diagram of the overall flow of data in a data processing system, that employs the present invention, for processing business contact information from multiple contact channels. The system shown in FIG. 3 is based on the Epiphany [version] E.5 AP Analytic Platform (hereinafter E.5) software that is available from E.piphany, Inc., 1900 South Norfolk, Suite 310, San Mateo, Calif. 94403. E.5 includes well-known extract-transform-load (ETL) software programming, including the transformation software 128, the load software 130, as well as the means for accommodating specialized construction of the extractor 124. These functions, together with E.5's semantic transformations, clean, prune, combine, standardize and conform the data for the data model 112.

As shown in FIG. 3, an extractor 124 provides a common interface across each of the contact source systems (i.e., contact channels), i.e., a telephone reception contact channel 126, including an Automatic Call Distributor (ACD) 114 and an Interactive Voice Response system (IVR) 116, a web collaboration contact channel 118, a Customer Relationships Management (CRM) contact channel 120, and an e-mail contact channel 122.

The extractor 124 provides a facile means of instancing mandated data specifications and protocols in all of the contact channels, thus facilitating a standard form of interface with each one of the separate contact channels. It will further be appreciated that the invention could be embodied in versions comprising individual interfaces with each contact channel for the instancing therein of such mandated data specifications. The extractor 124 provides a means by which a resource which entertains a contact or contact channel can be infused with data requirements. The extractor 124 dictates rules regarding the required specifications and protocols of the data which a resource which entertains a contact or contact channel must collect for communication to the extractor 124. In this connection, the extractor 124 assures availability of specified data for extraction from all resources which entertain contacts or other contact channels. The extractor 124 is a specialized software engine instanced with cognizance of both the configured data specifications and protocols for each contact source database, as well as the capacities and specifications of the data model 112. The extractor 124 thus mandates and extracts data which the data model 112 requires from the contact source databases. The extractor is capable of extracting the data stored in each of the contact channel databases in a fashion that can be used for business analysis.

As also shown on FIG. 3, the data is then transformed by the transformation software 128 to a standardized usable format. Working together, the extractor 124 and the transformation software 128 handle slowly changing dimensions to ensure the historical integrity of the data. The load software 130 then populates the destination database, i.e., the data model 112, and acts as a temporary holding area prior to storage in the data model 112. The data model 112 is designed to collect data from all of the different contact channels in an integrated, unifying fashion. In order to apply the proper analytics, the data model 112 is configured to receive data from the various source systems, i.e., contact channels. Thus, the data model 112 accommodates, in an integrated fashion, each of the separate contact data sources into singular, centralized fact tables. The application server 132 then allows each of the users 134, 136, 138 to access the date model 112. The centralized fact tables are built in accordance with a star schema.

Figure 4:
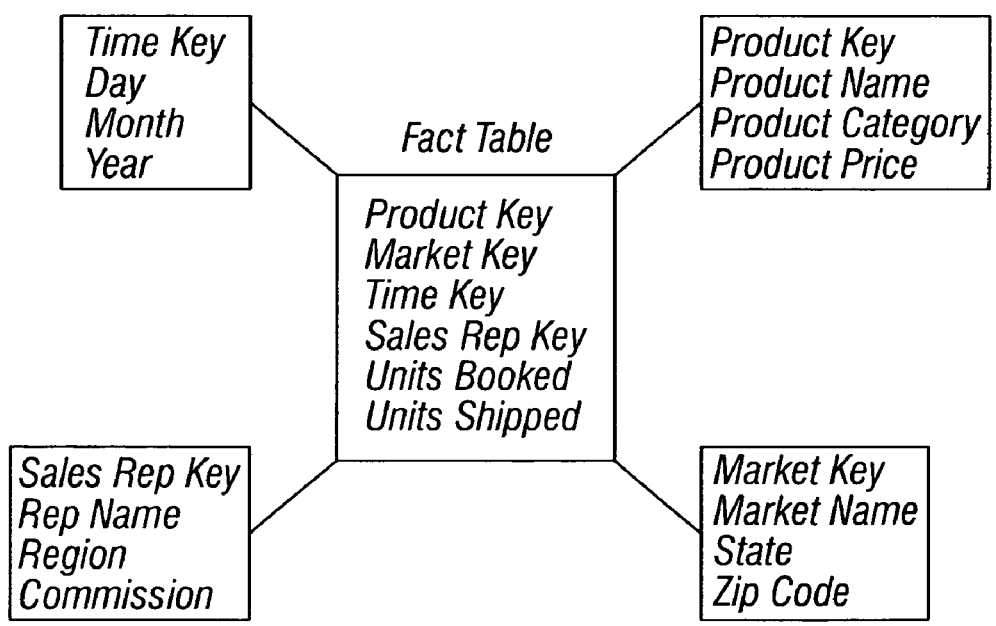
FIG. 4 is a block diagram exemplifying the structure of star schema for storing information (i.e., data) employed by the present invention.

FIG. 4 illustrates the star schema structure. Centralized fact tables receive and store the data that is collected by each of the contact channels, including the telephone reception system 126, the Automatic Call Distributor (ACD) 114, the Interactive Voice Response (IVR) 116, the web collaboration channel 118, the Customer Relationships Management (CRM) channel 120, and the e-mail contact channel 122. Each contact channel generates data (or metrics) relating to occurrences and events such as duration of the contact, whether a sale was made, whether a problem was solved, the time of day and date of the contact and other such metrics. Each contact channel comprises an independent separate system that stores the metrics for that particular system. The present invention is capable of integrating all those metrics into singular data tables using a star schema approach illustrated in FIG. 4 to organize the data and allow extraction of valuable business analytical information.

Typically, each of the systems for each of the contact channels uses an OLTP (On-Line Transactional Processing System) that is capable of individually storing data in a very fast manner with the ability to force the integrity of the data. The problem with these types of systems is that it is difficult to apply modern-day analytical processing to that type of data. The extractor 124 (FIG. 3) is a sophisticated sequel developer that is able to retrieve the data and apply complex report applications and processes for extracting that data for each of those systems.

The present invention presents an improvement over the prior art in that the present invention utilizes all of the separate data sources in an integrated fashion. More specifically, the data model of the present invention includes dimensions designed to accommodate the integration of each separate data source into discreet fact tables of a star schema. Database terms and concepts are applied across communications channels, i.e., across each database of the different communication/contact channels.

Figure 5:
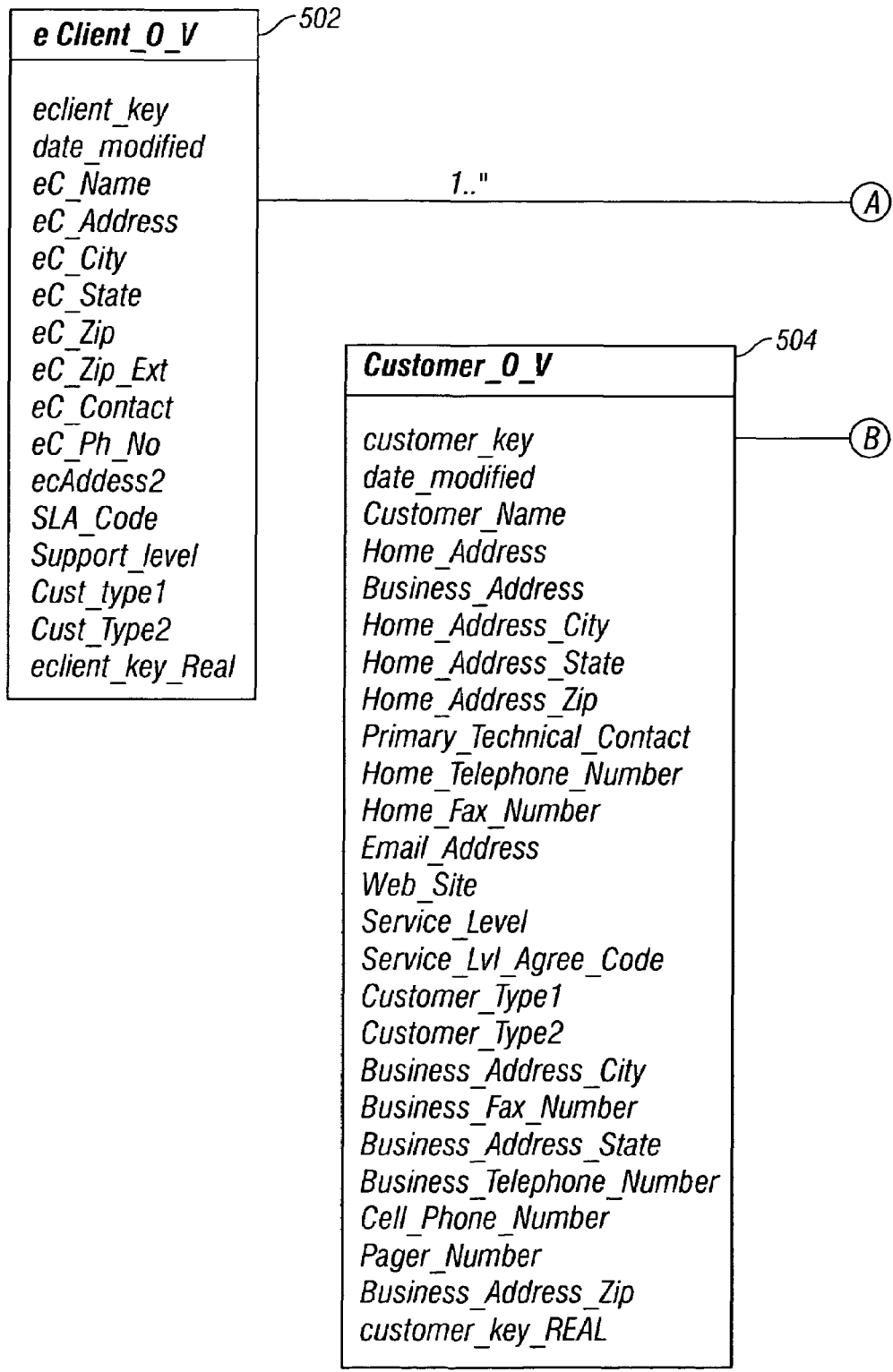
FIG. 5 is a block diagram of the star schema for storing information related to contacts received by a business using the present invention.
Figure 5:
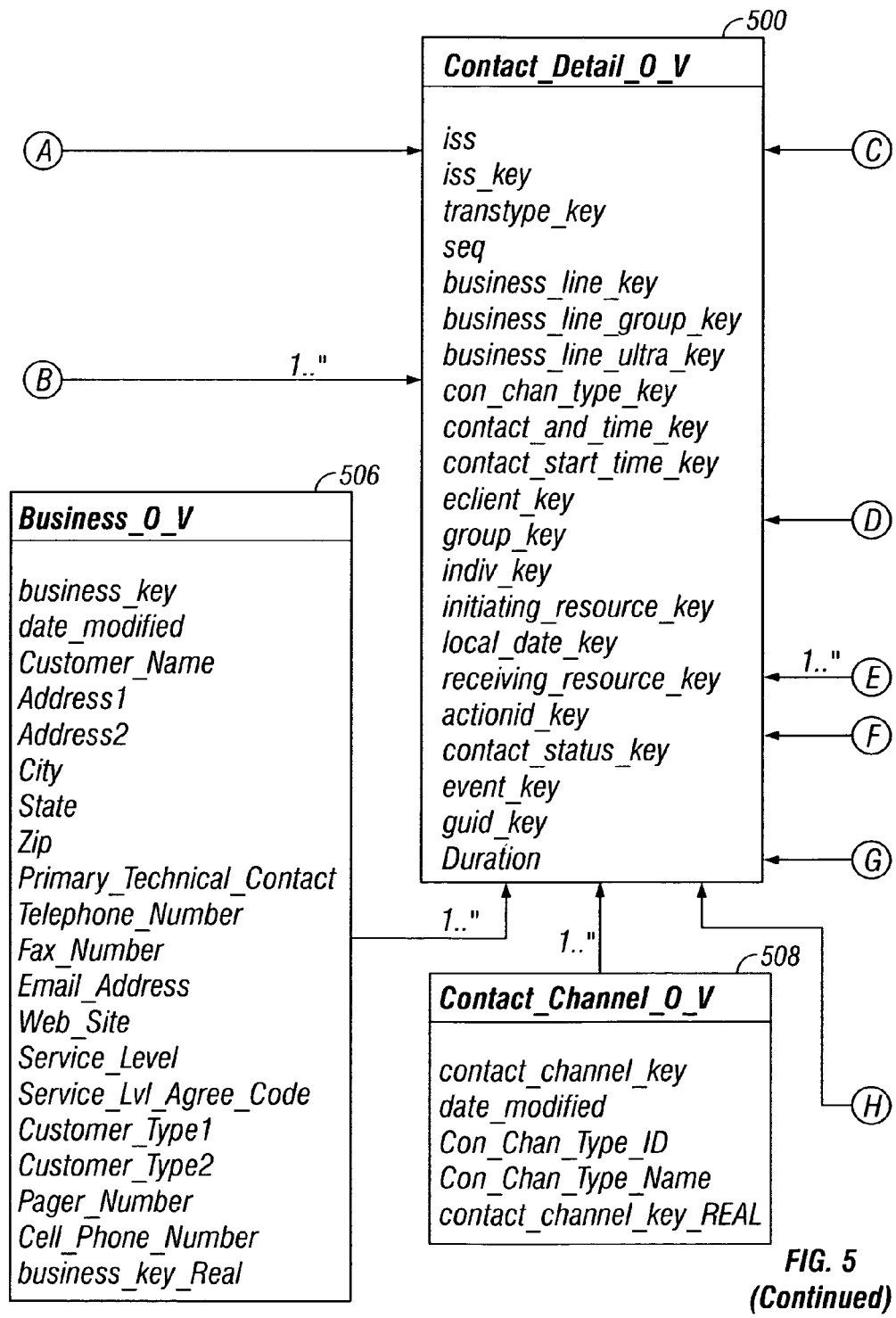
Figure 5:
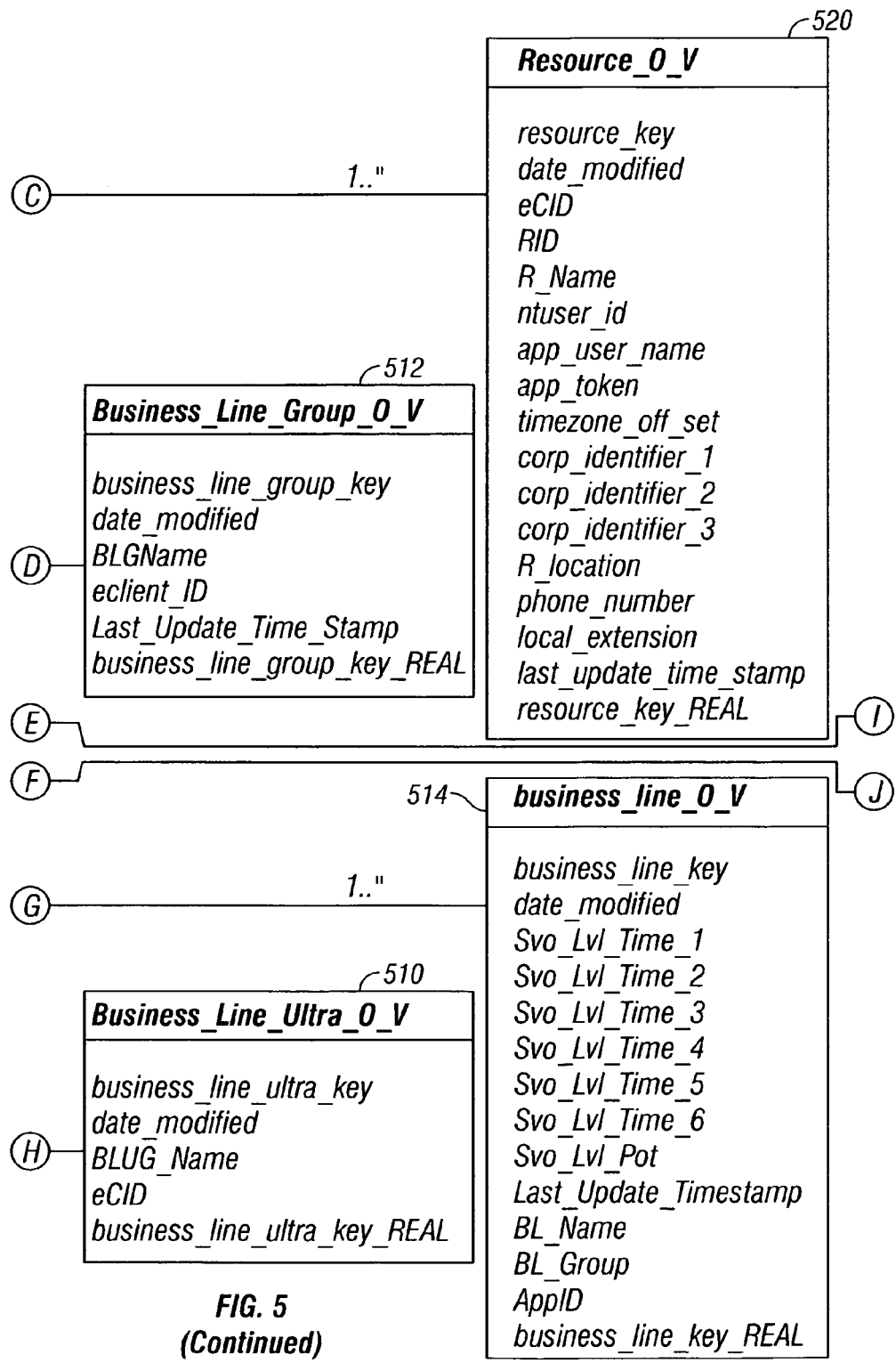
Figure 5:
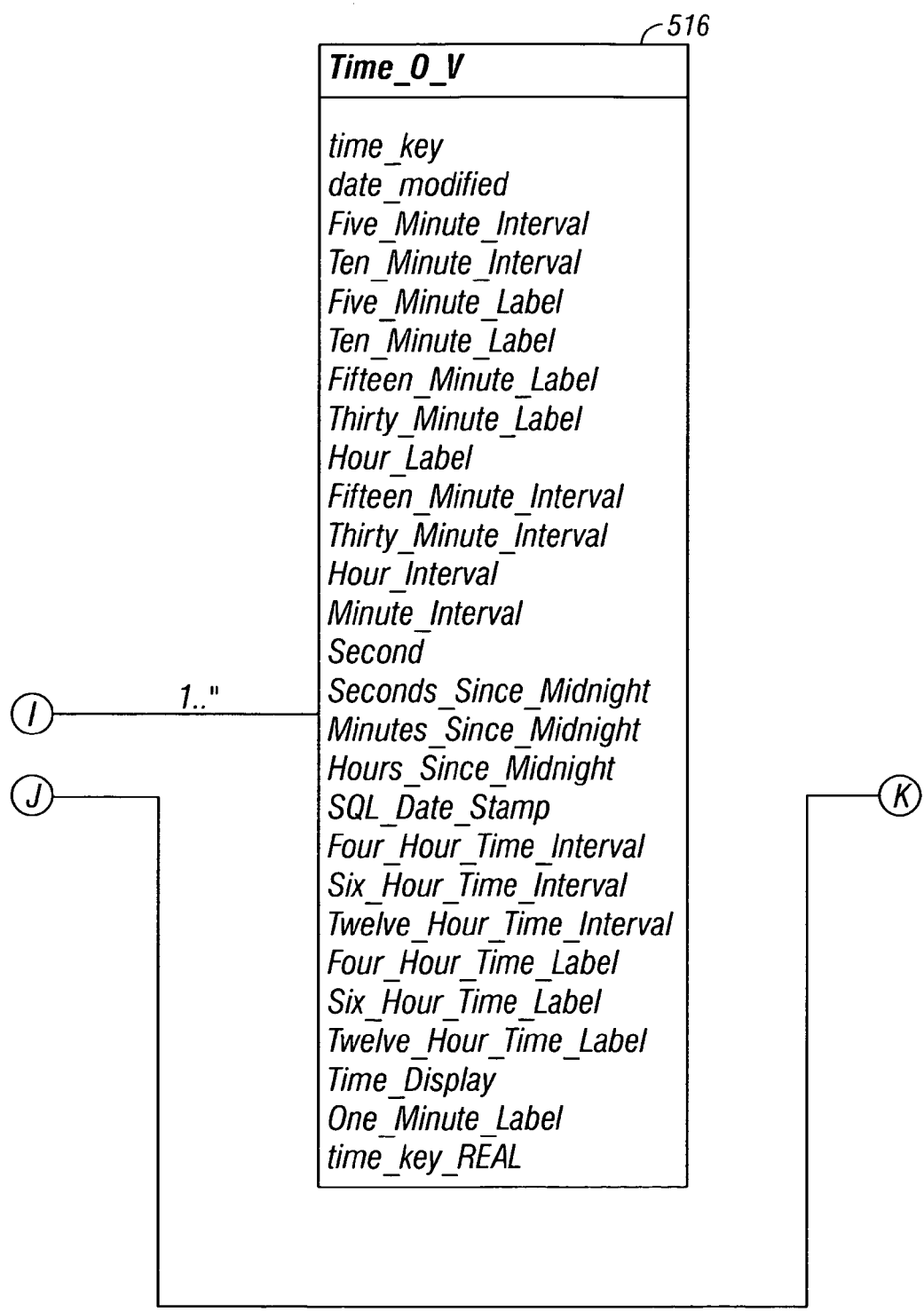
Figure 5:
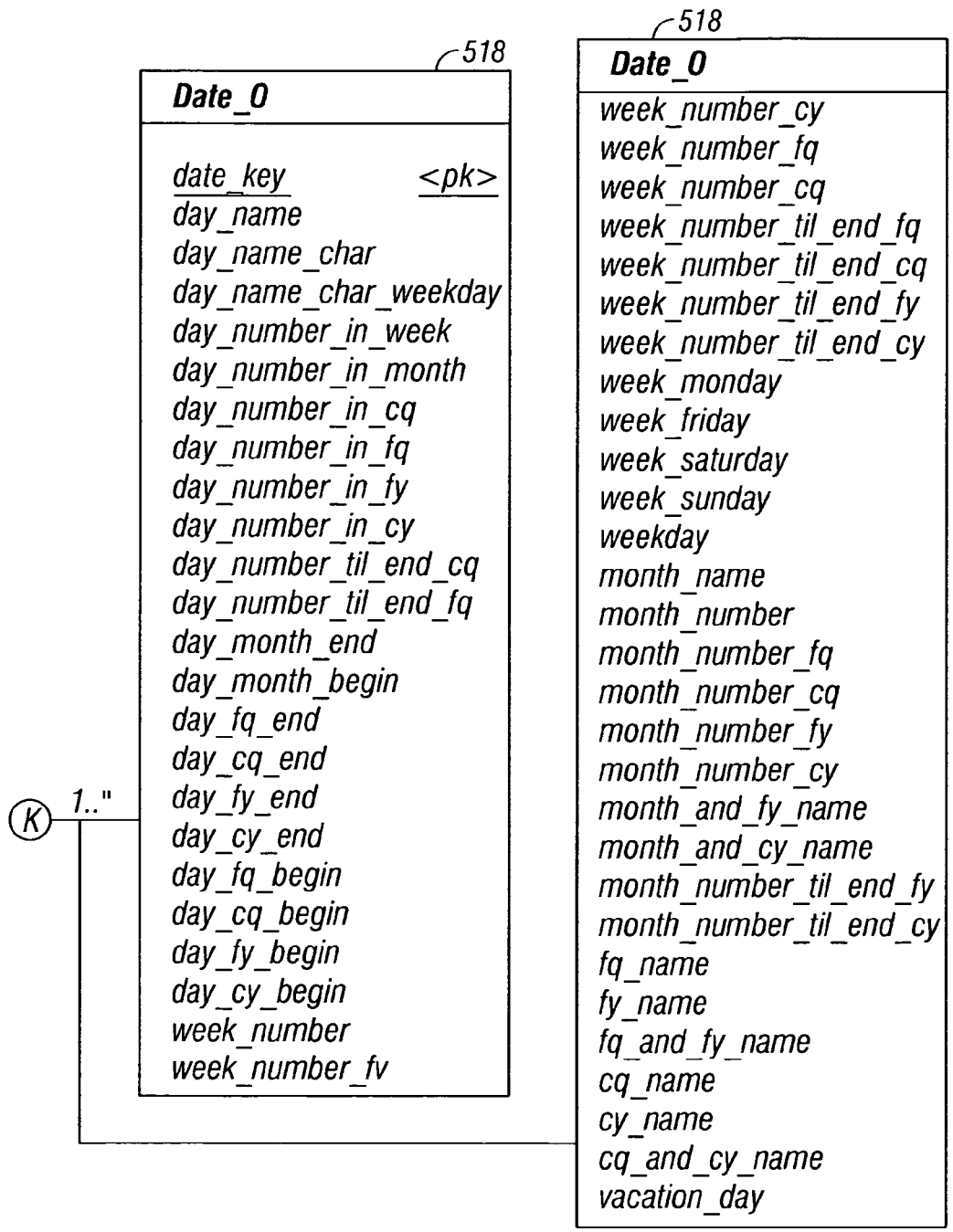

FIGS. 5 through 13 display the mapping of the data structure of the star schema in accordance with the present invention. FIG. 5 illustrates the first central fact table containing data and a first set of attributes describing customer communications received through said communication channels, said first set of attributes drawing from ten dimension tables 502–520 having data describing the time of the communication (516), the date of the communication (518), the entity receiving the communication from the customer (502), the individual customer (504), the business entity customer (506), the resource entertaining the communication (520), the channel through which the communication was received (508), the business line responsible for the subject of the communication (512), the business line group (510) responsible for the subject of the communication, and the business line ultra group responsible for the subject of the communication.

Figure 6:
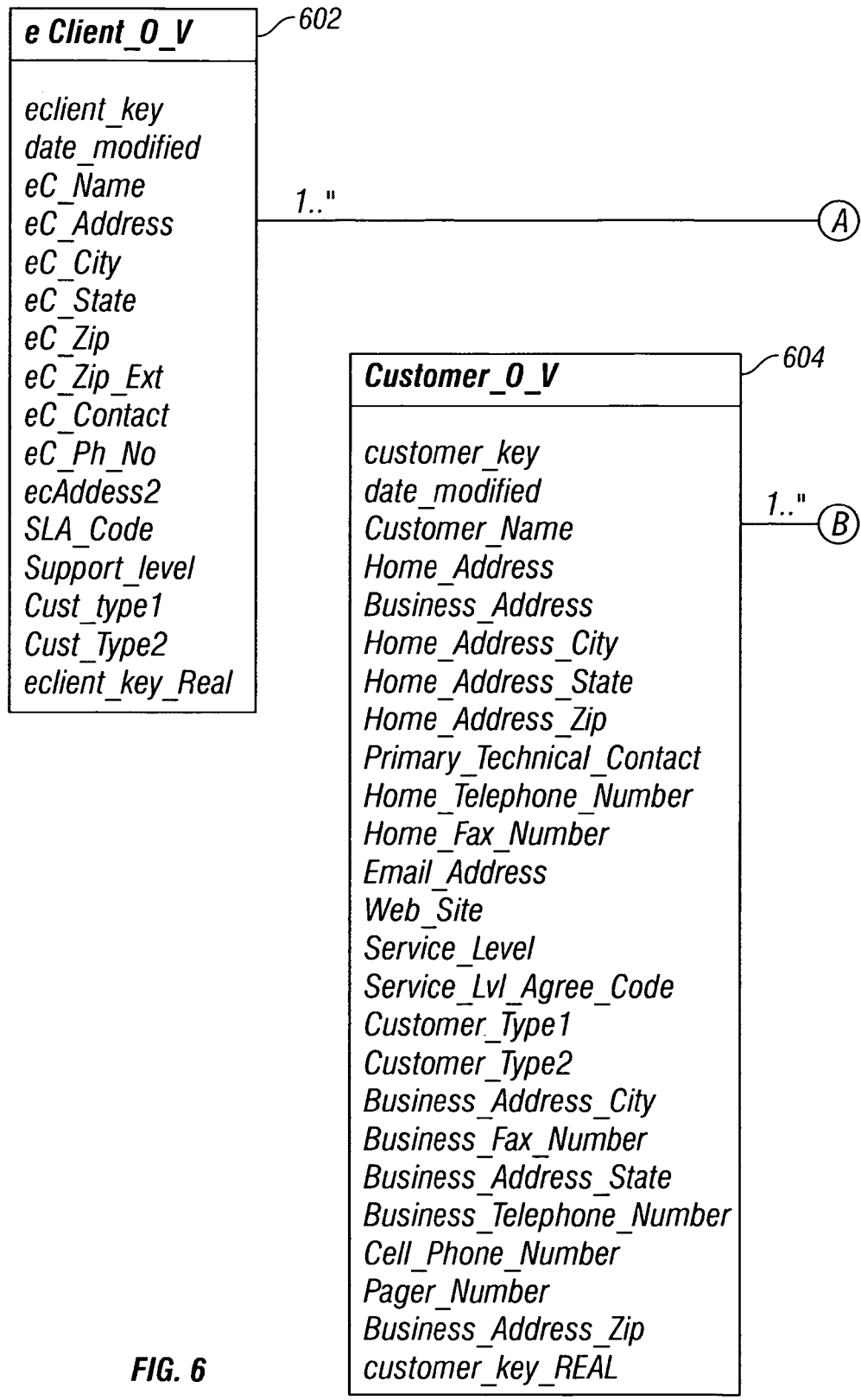
FIG. 6 is a block diagram of the star schema for storing information related to cases opened by a business using the present invention.
Figure 6:
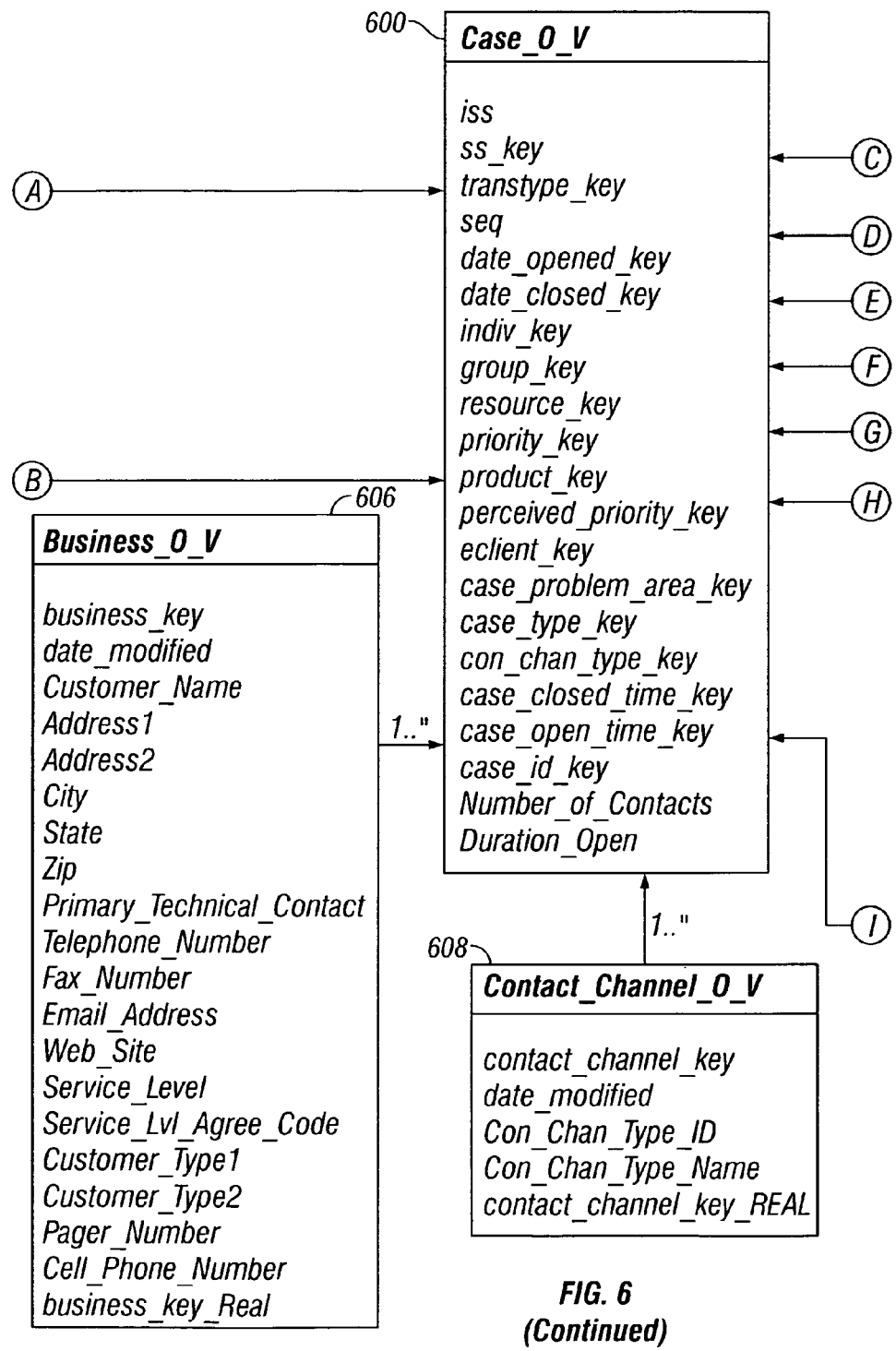
Figure 6:
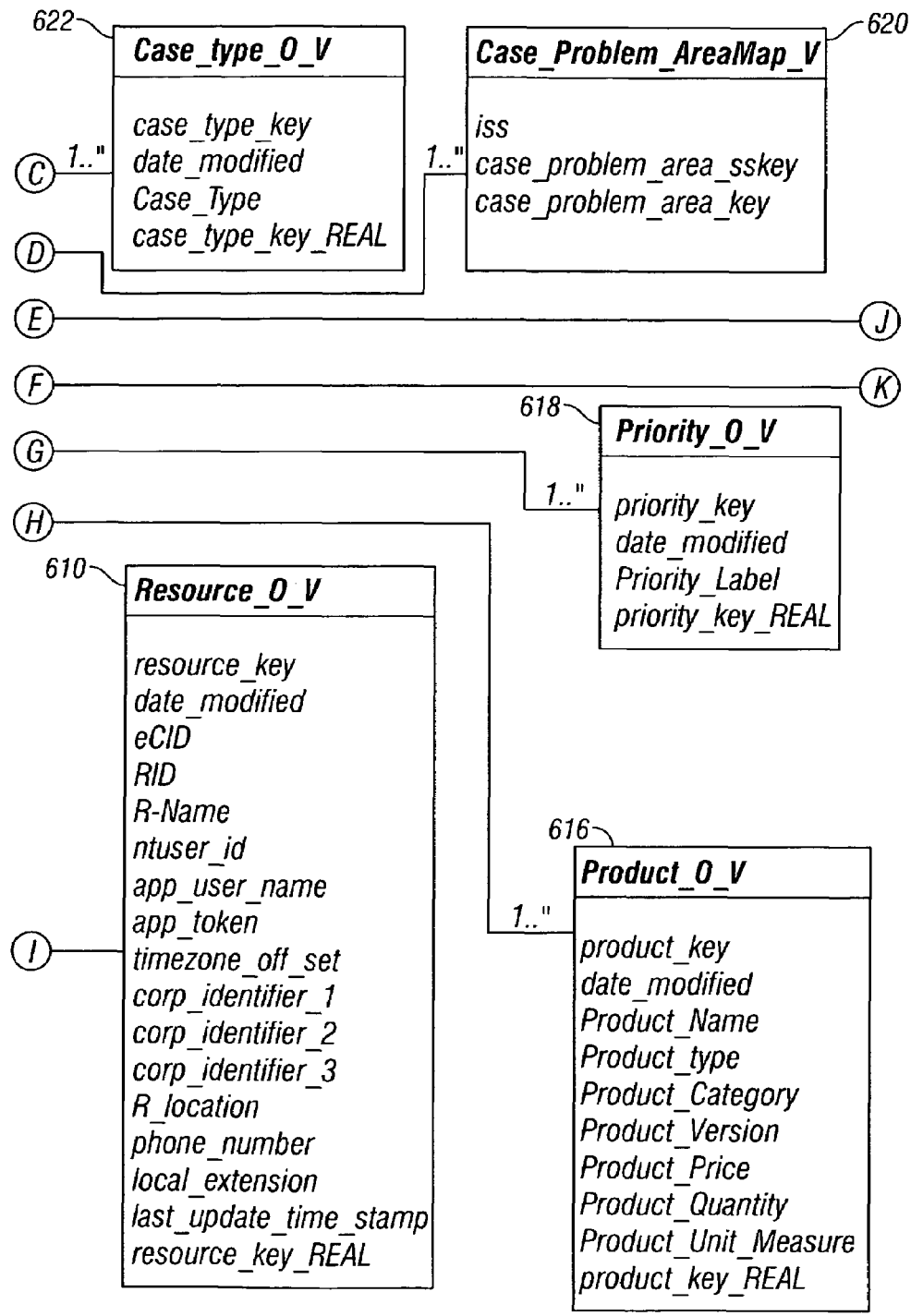
Figure 6:
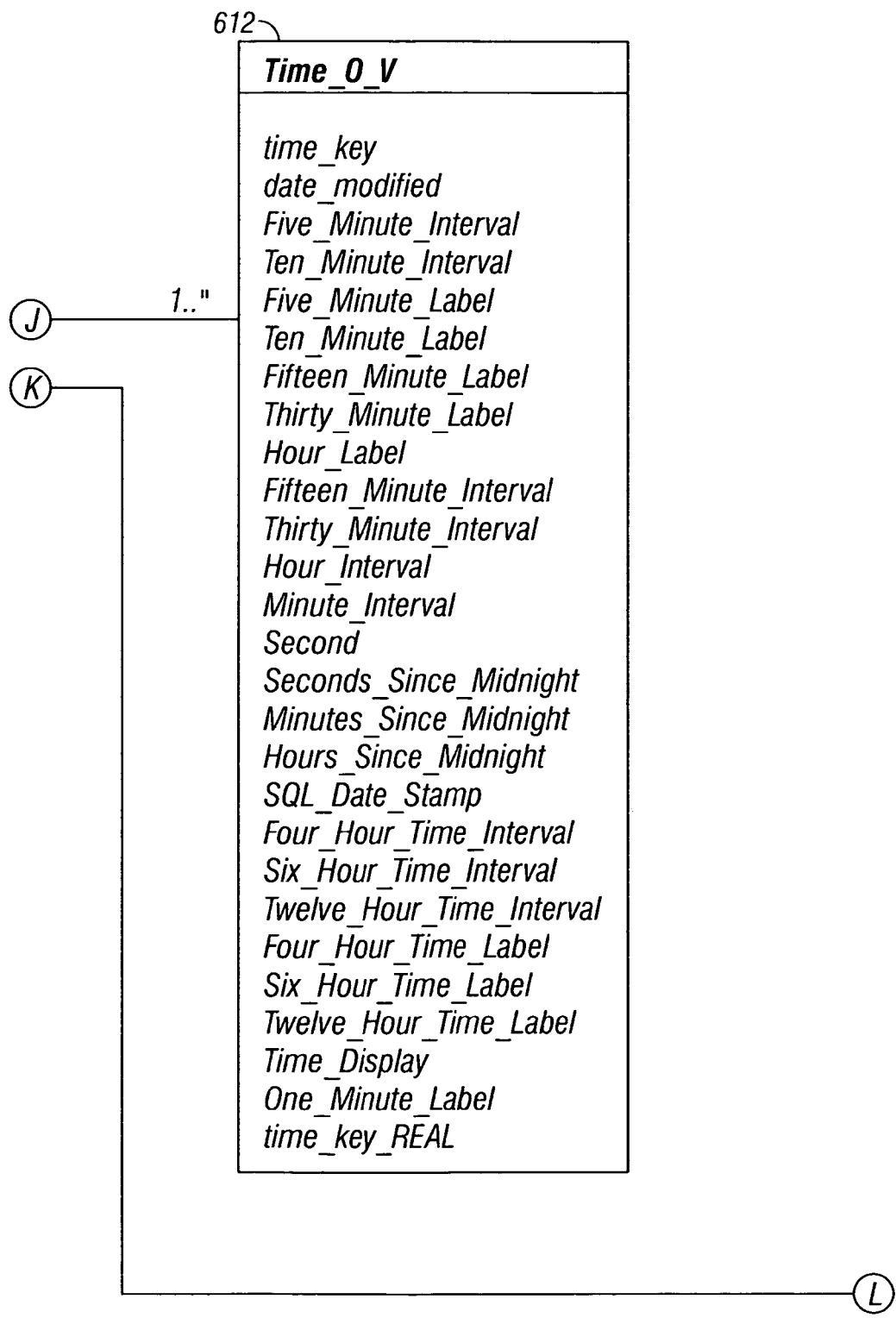
Figure 6:
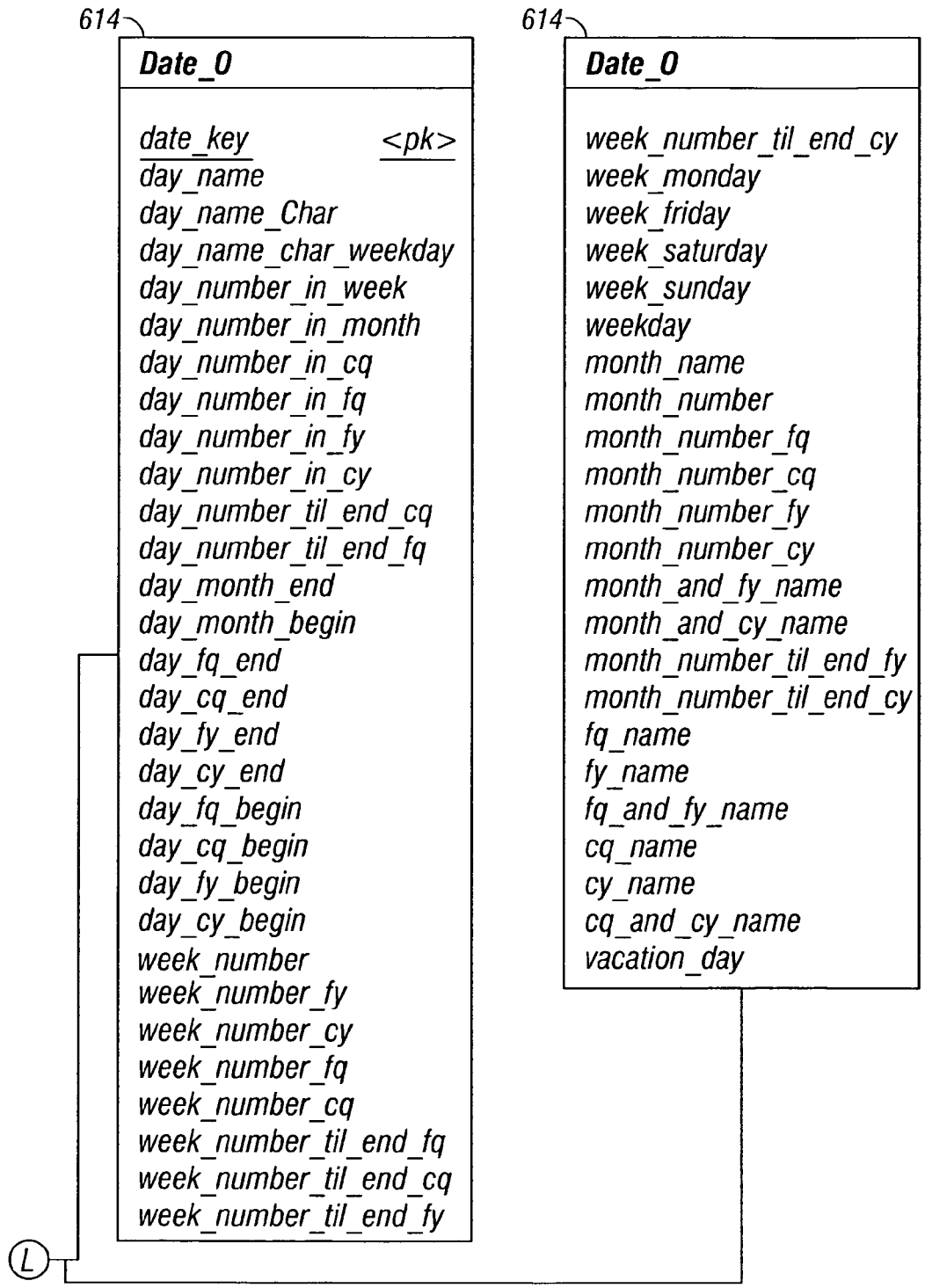

FIG. 6 illustrates the a second central fact table 600 containing data and a second set of attributes describing cases opened in response to customer communications received through said communication channels, said second set of attributes drawing from eleven dimension tables 602–622 containing data describing the entity receiving the communication (602), the individual customer (604), the business entity customer (606), the date of the communication (614), the time of the communication (612), the resource entertaining the communication (610), the channel through which the communication was received (608), the subject of the communication (620), the subject area in which the communication is categorized (622), the priority of the communication (618), and the product involved in the communication (616).

Figure 7:
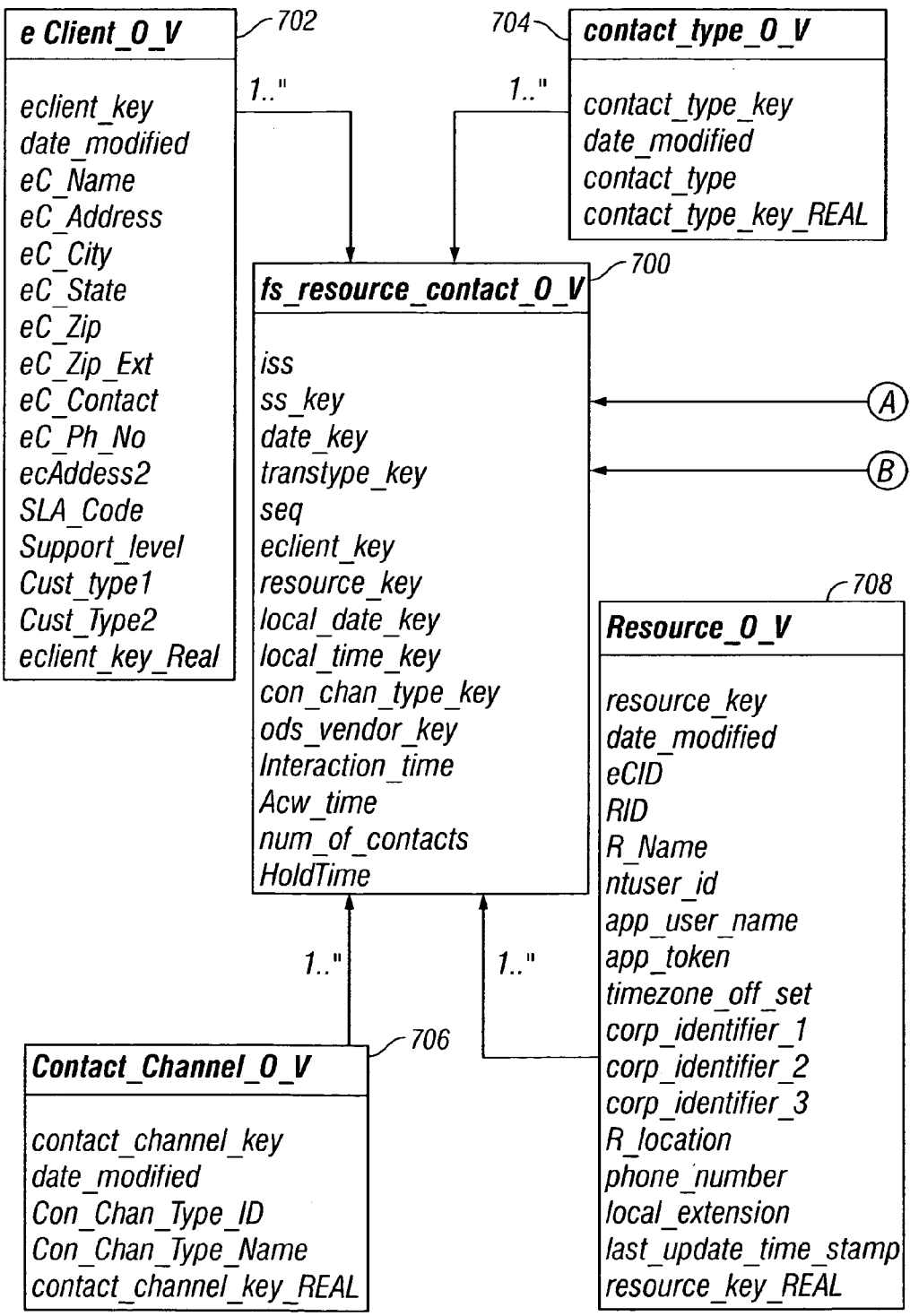
FIG. 7 is a block diagram of the star schema for storing information related to resource which entertains a contact with a business using the present invention.
Figure 7:
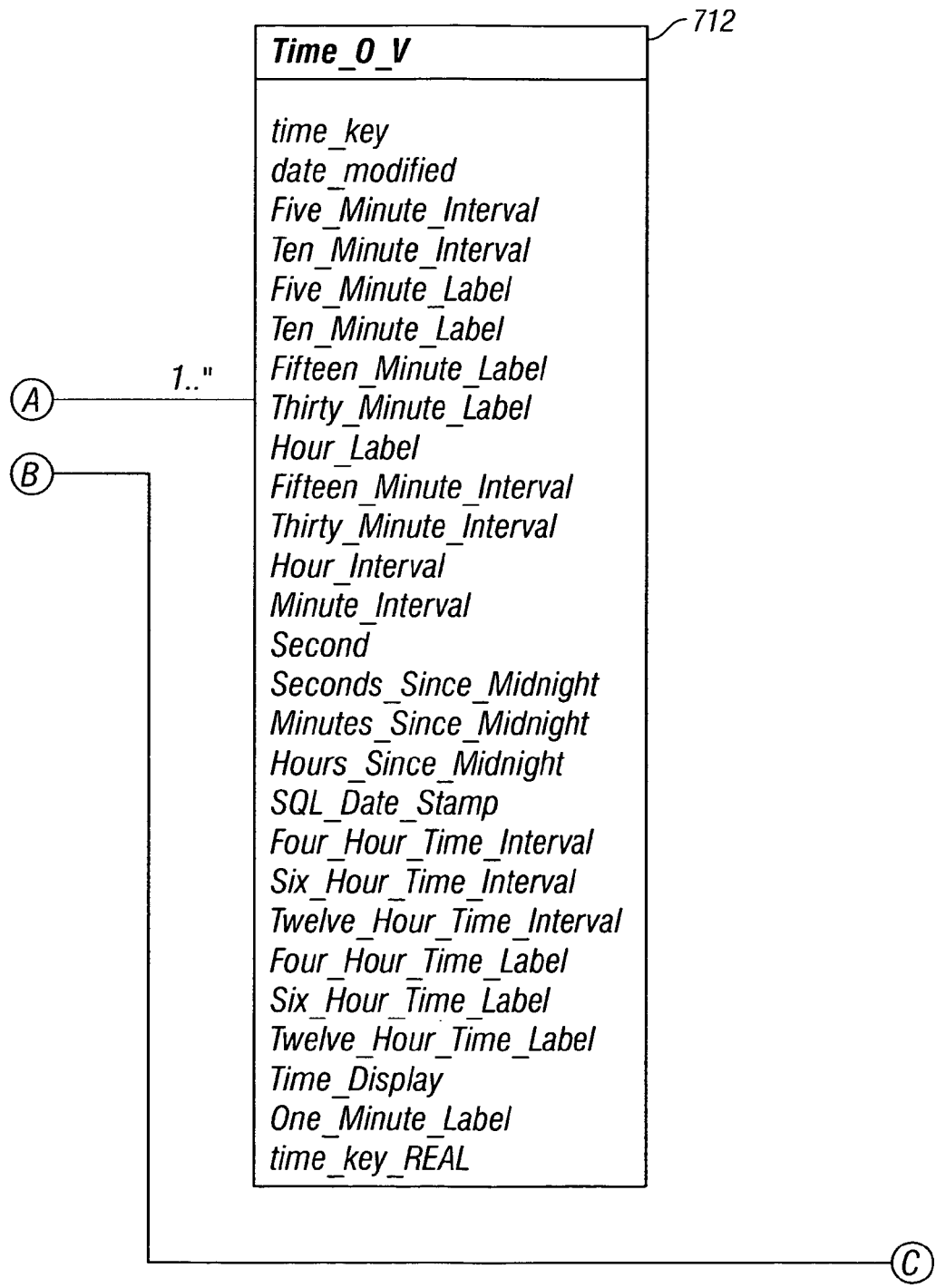
Figure 7:
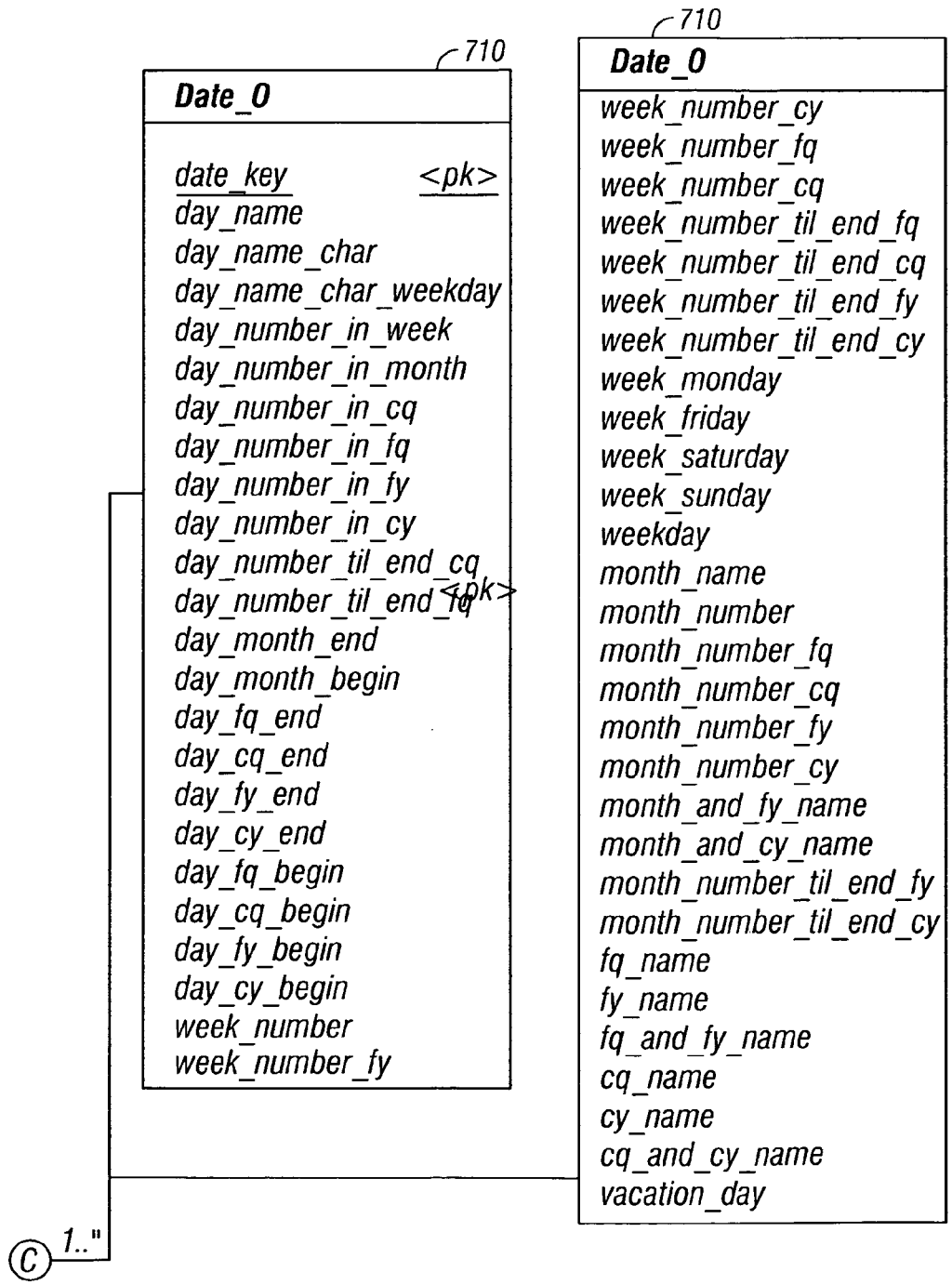

FIG. 7 illustrates a third central fact table 700 containing data and a third set of attributes describing resources which entertain customer communications received through said communication channels, said third set of attributes drawing from six dimension tables 702–712 containing data describing the entity receiving the communication (702), the date of the communication (710), the time of the communication (712), the resource entertaining the communication (708), the channel through which the communication was received (706) and the type of communication received (704).

Figure 8:
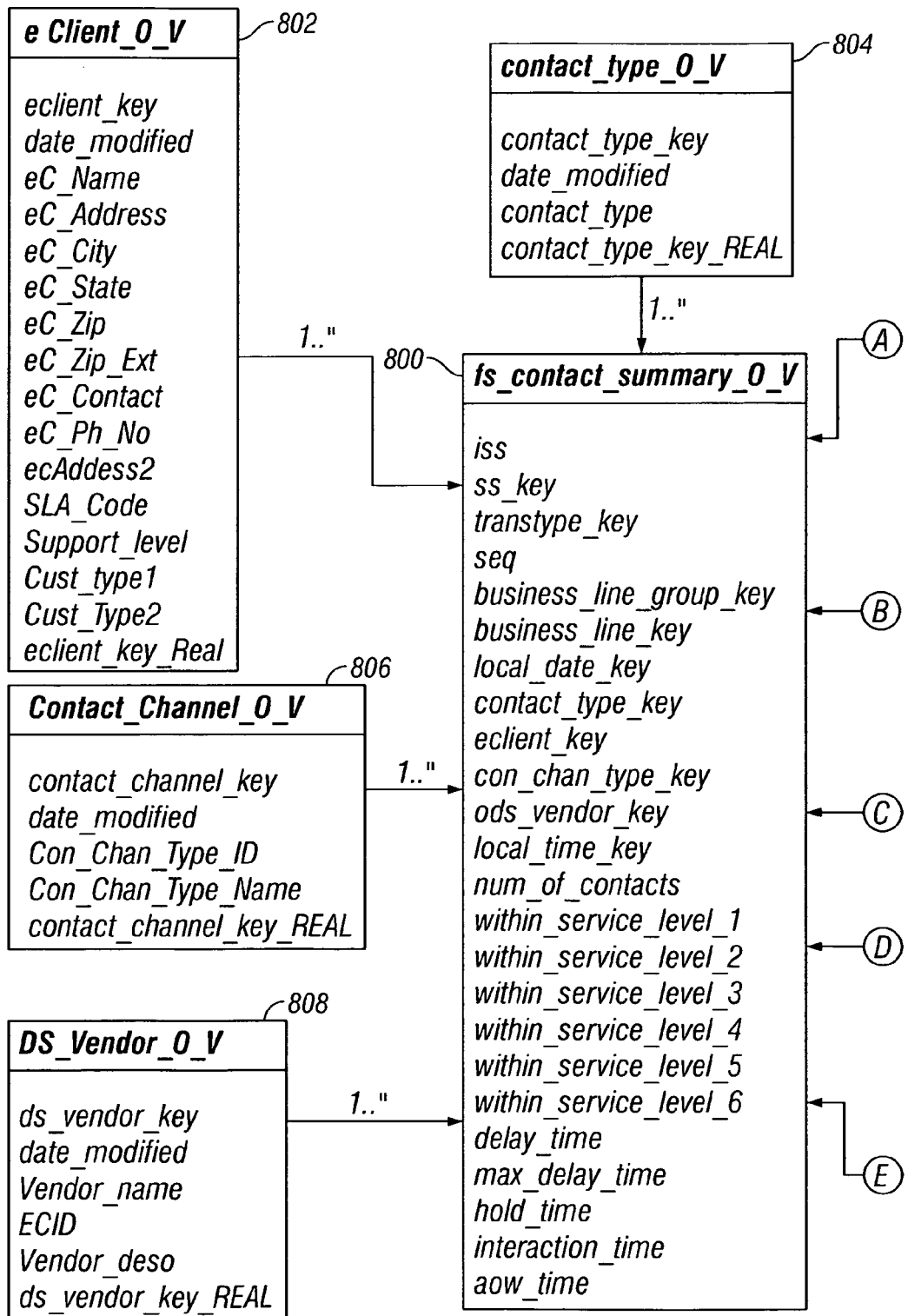
FIG. 8 is a block diagram of the star schema for storing information related to summaries of contacts received by a business using the present invention.
Figure 8:
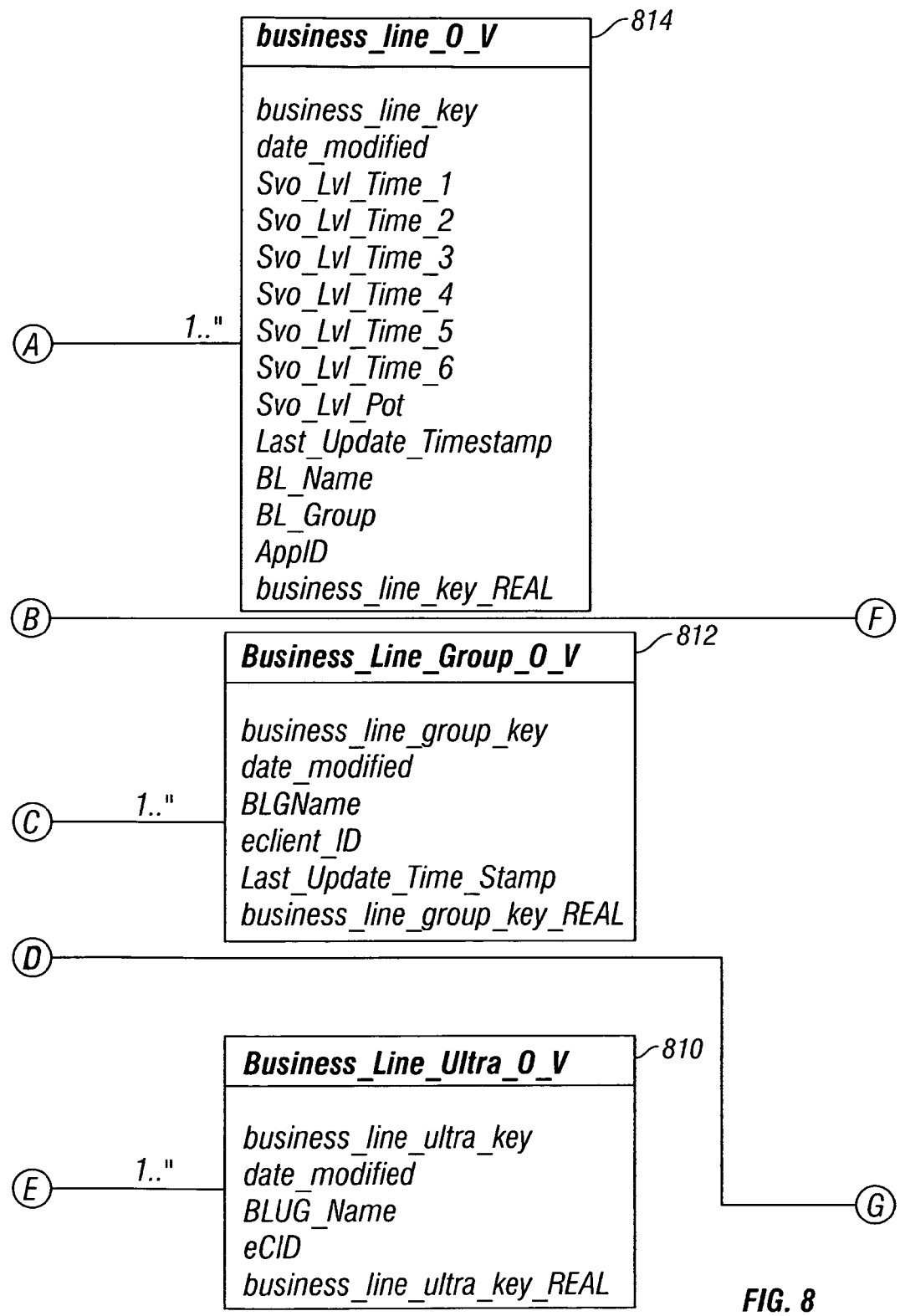
Figure 8:
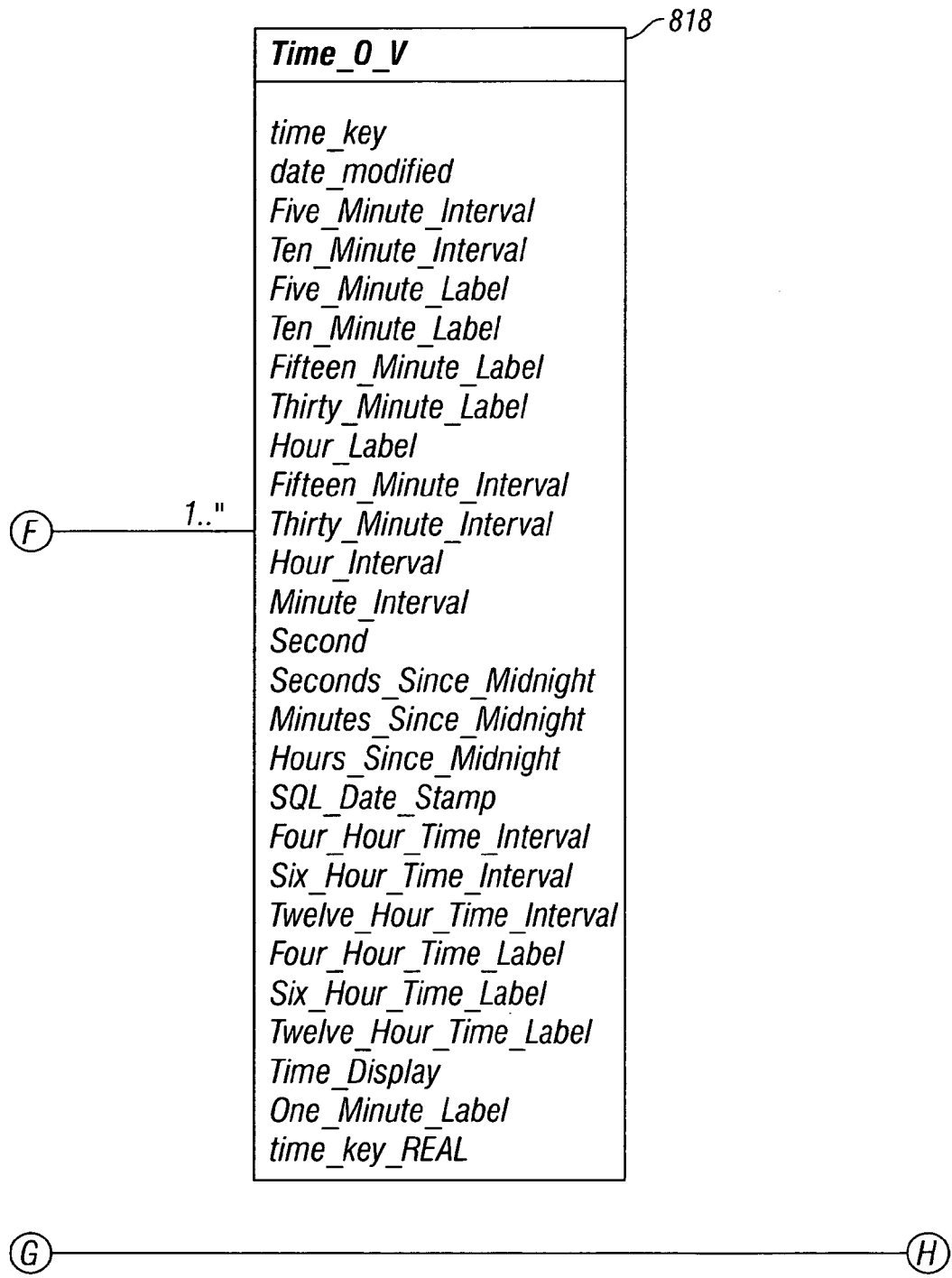
Figure 8:
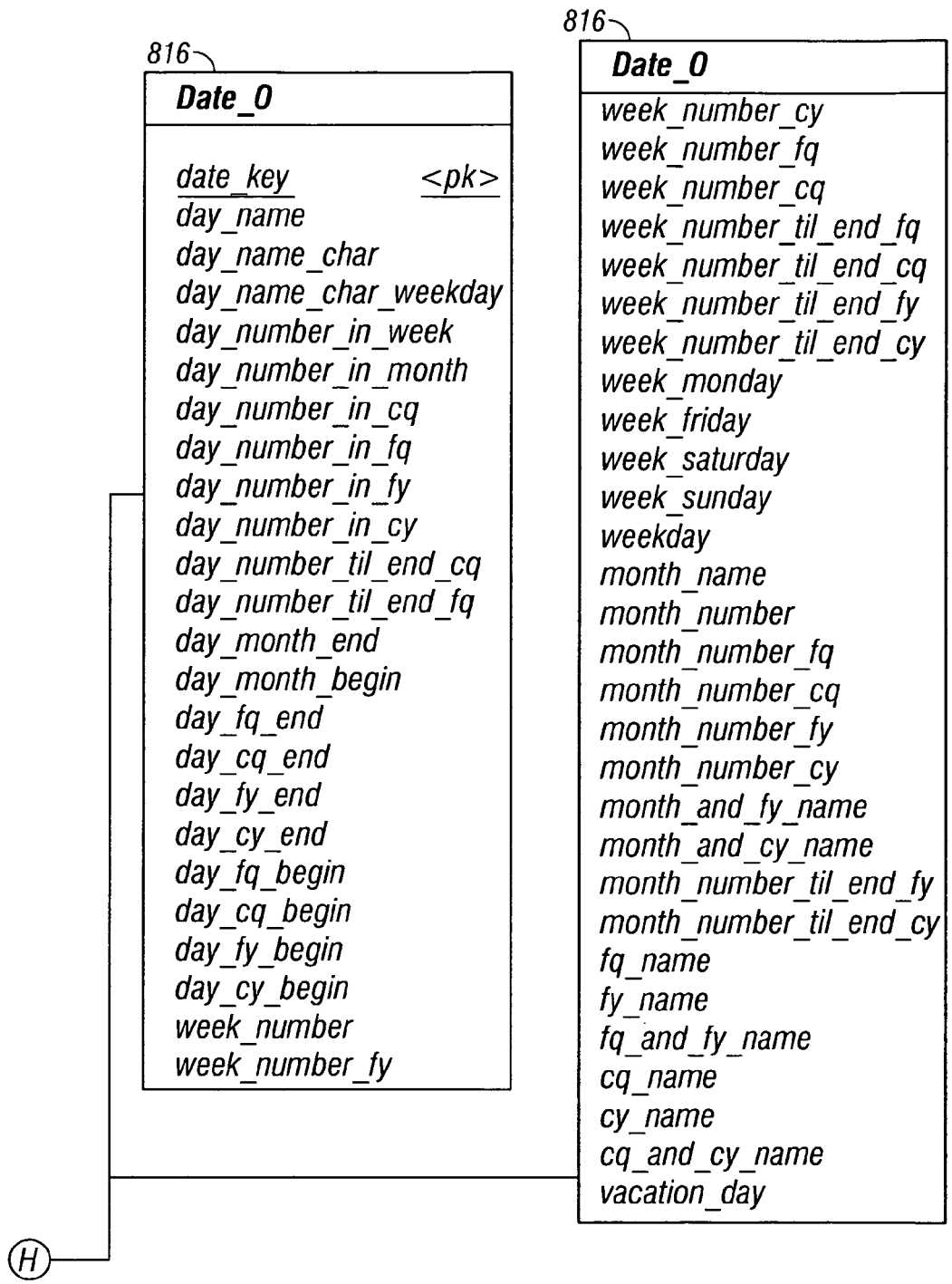

FIG. 8 illustrates a fourth central fact table 800 containing data and a fourth set of attributes describing summaries of contacts received through said communications channels, said fourth set of attributes further drawing from nine dimension tables 802–818 containing data describing the time of the communication (818), the date of the communication (816), the entity receiving the communication from the third party (802), the channel through which the communication was received (806), the type of contact received (804), the business line responsible for the subject of the communication (814), the business line group responsible for the subject of the communication (812), the business line ultra group responsible for the subject of the communication (810), and the vendor supplying product (808).

Figure 9:
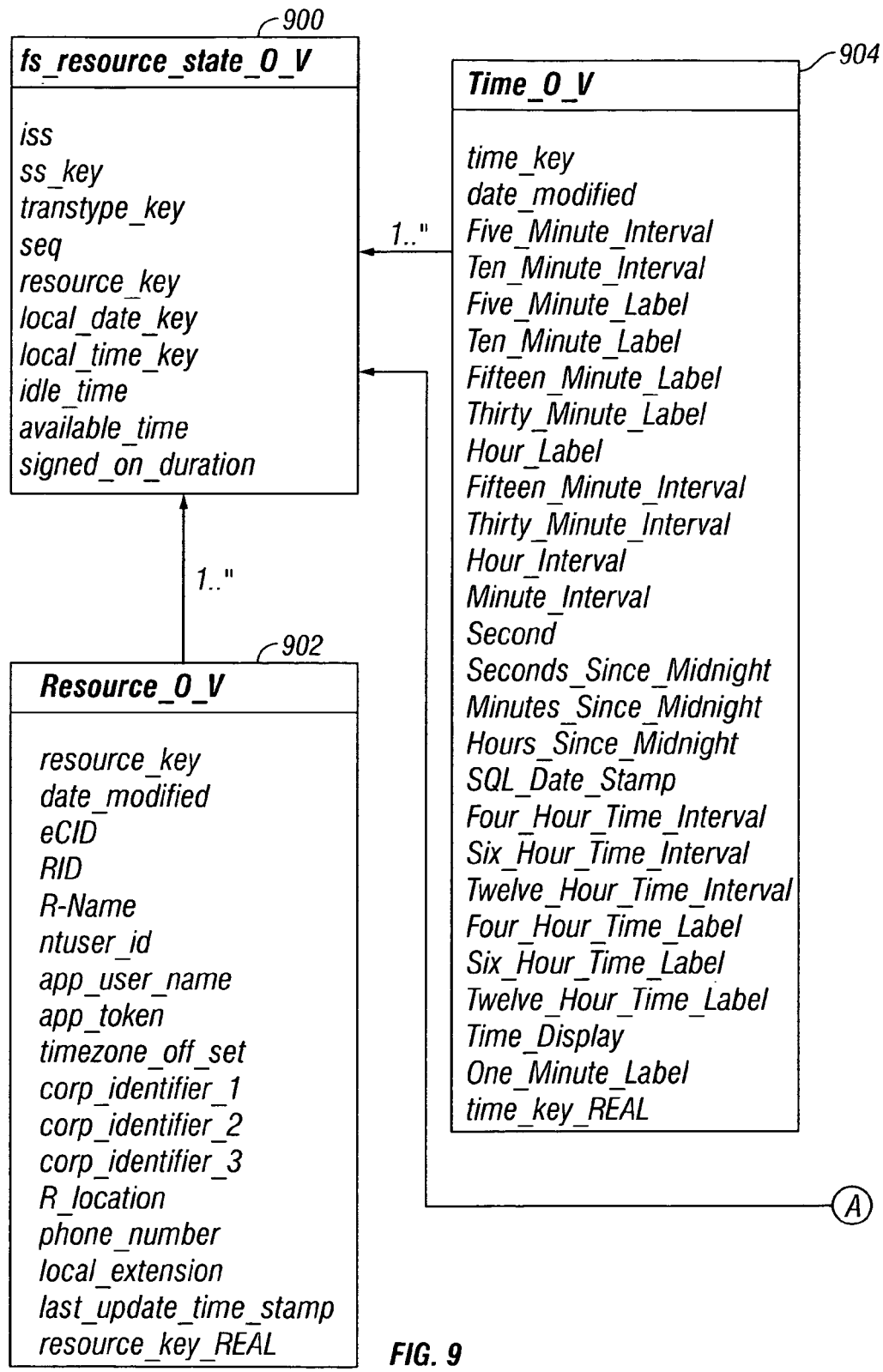
FIG. 9 is a block diagram of the star schema for storing information related to time related to contacts experienced by a business using the present invention.
Figure 9:
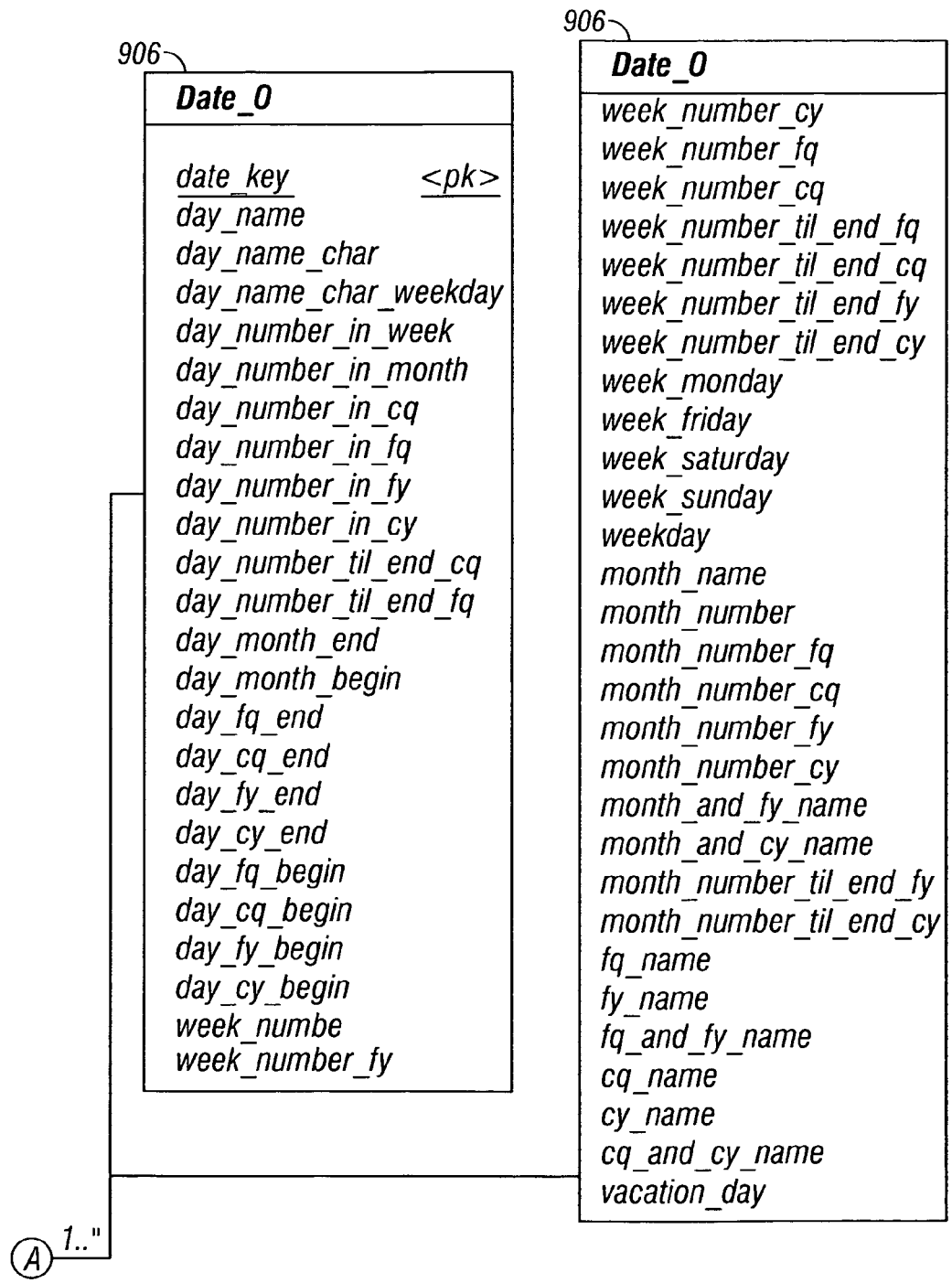

FIG. 9 illustrates a fifth central fact table 900 containing data and a fifth set of attributes describing the state of the resources entertaining contacts received through said communications channels, said fifth set of attributes drawing from three dimension tables 902–906 of data describing the time of the communication (904), the date of the communication (906) and the resource entertaining the communication (902).

Figure 10:
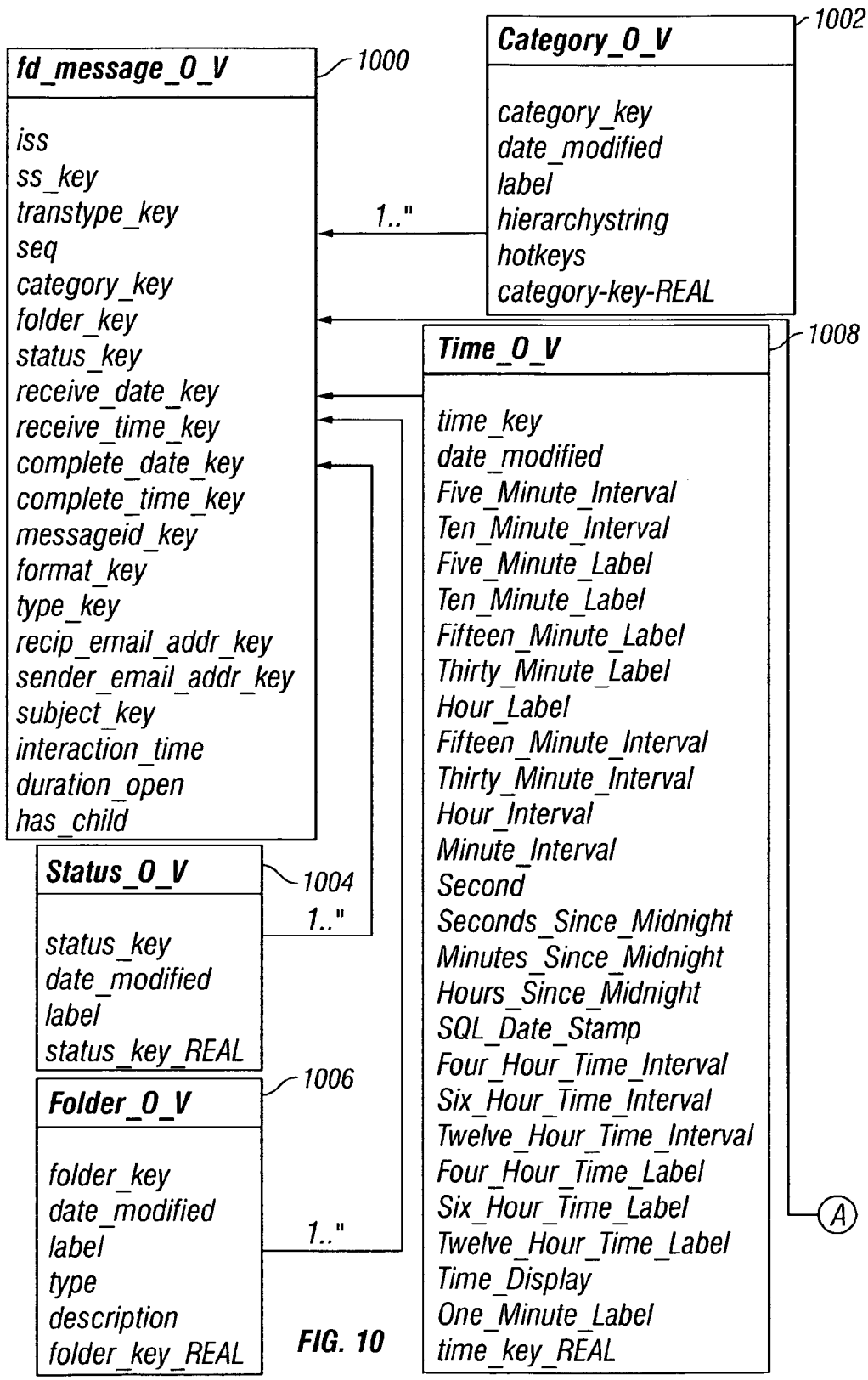
FIG. 10 is a block diagram of the star schema for storing information related to email messaging relating to contacts experienced by a business using the present invention.
Figure 10:
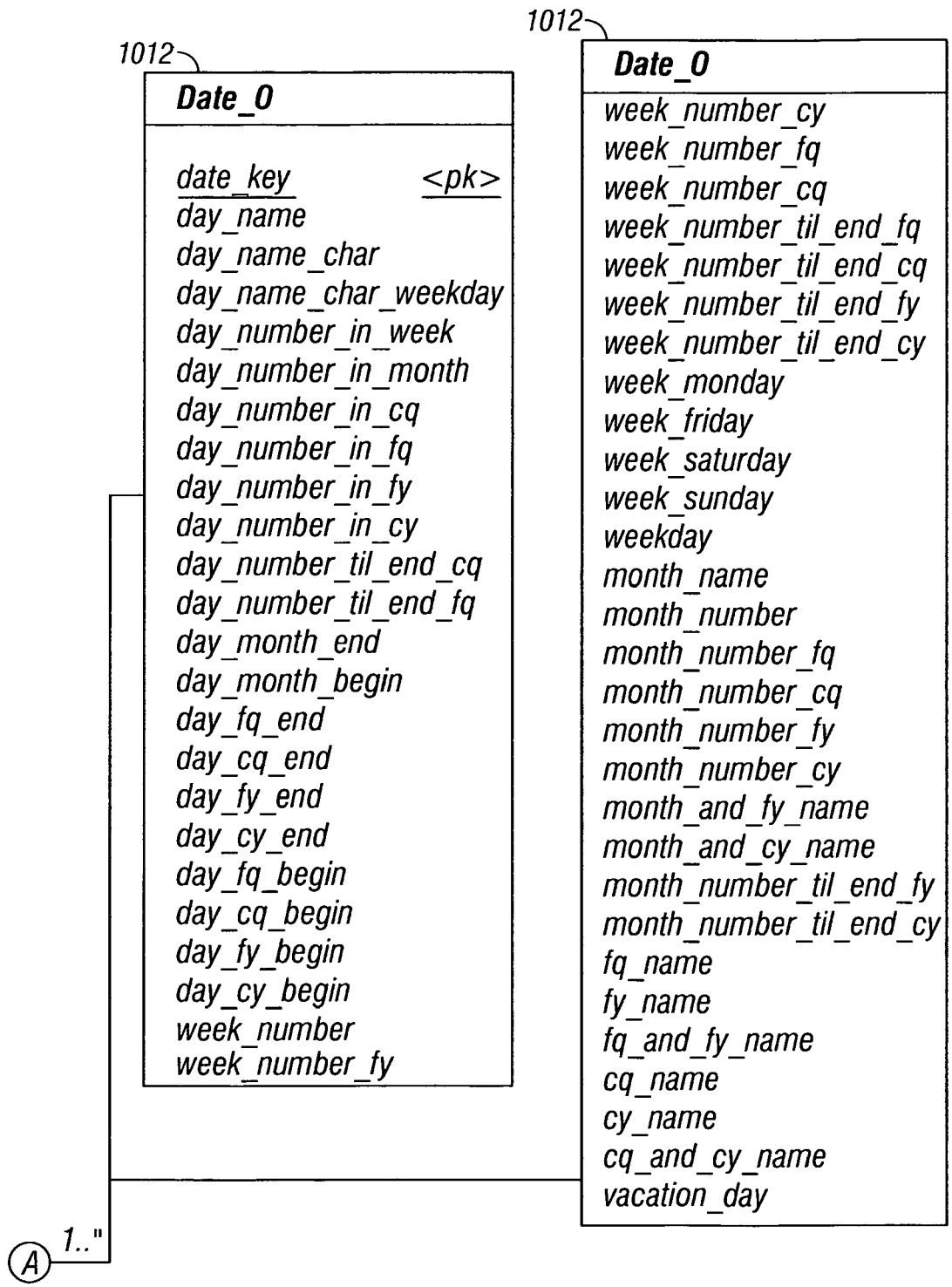

FIG. 10 illustrates a sixth central fact table 1000 containing data and a sixth set of attributes describing email messaging transmitted through said communications channels, said sixth set of attributes drawing from five dimension tables 1002–1012 containing data concerning the time of the communication (1008), the date of the communication (1012), the category of the communication (1002), the status of the communication (1004) and the folder in which the communication is stored (1006).

Figure 11:
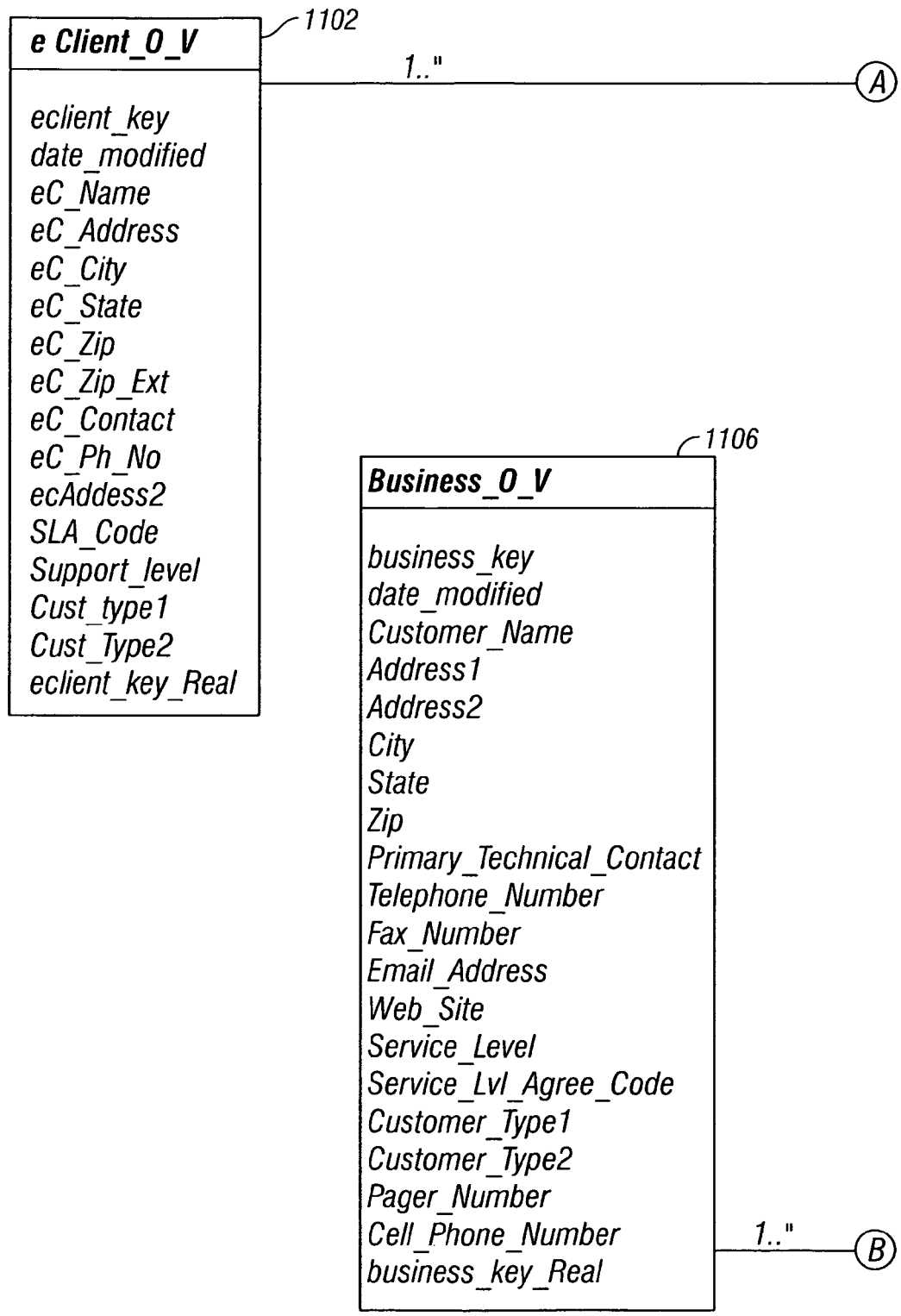
FIG. 11 is a block diagram of the star schema for storing information related to sales achieved by a business using the present invention.
Figure 11:
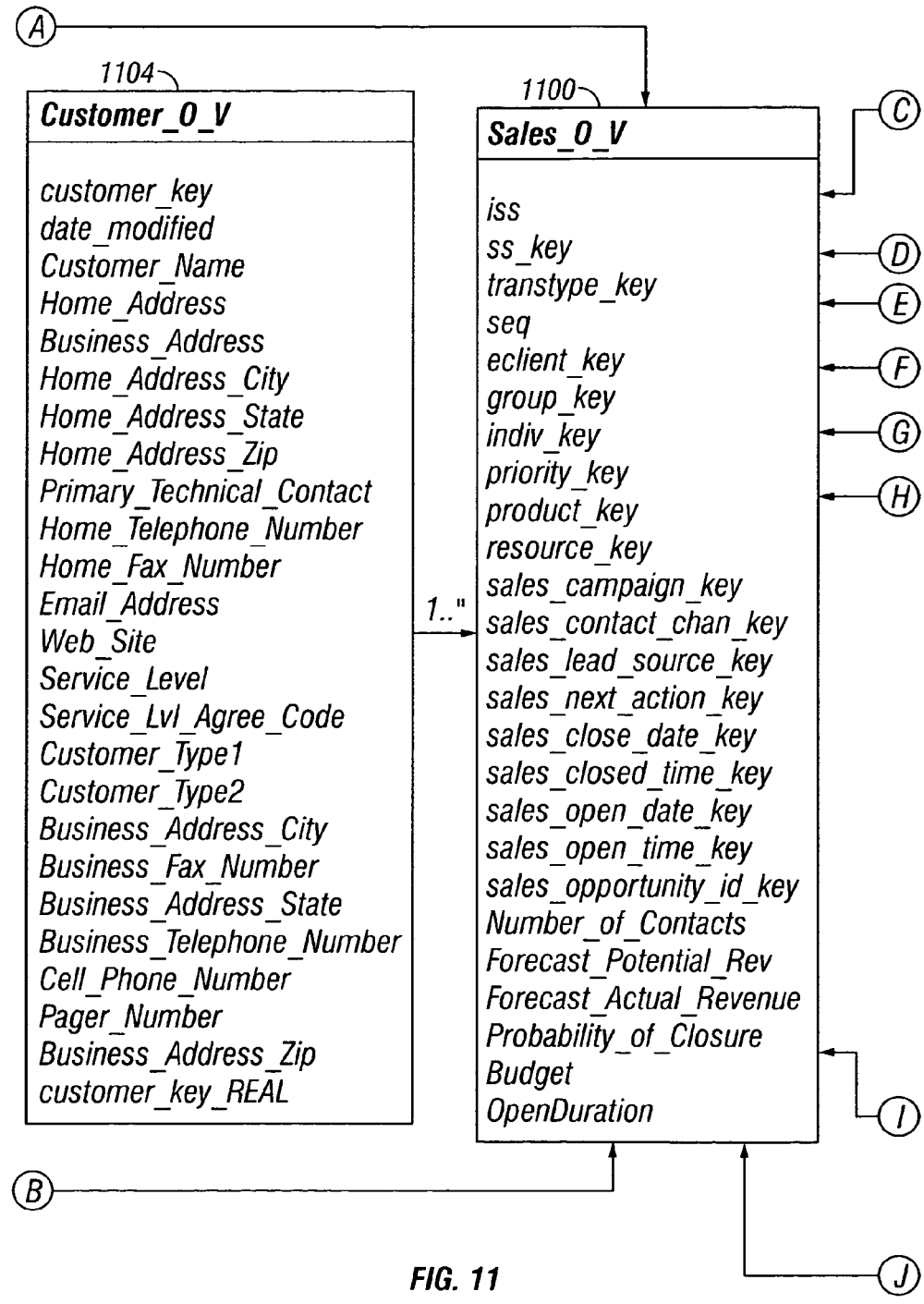
Figure 11:
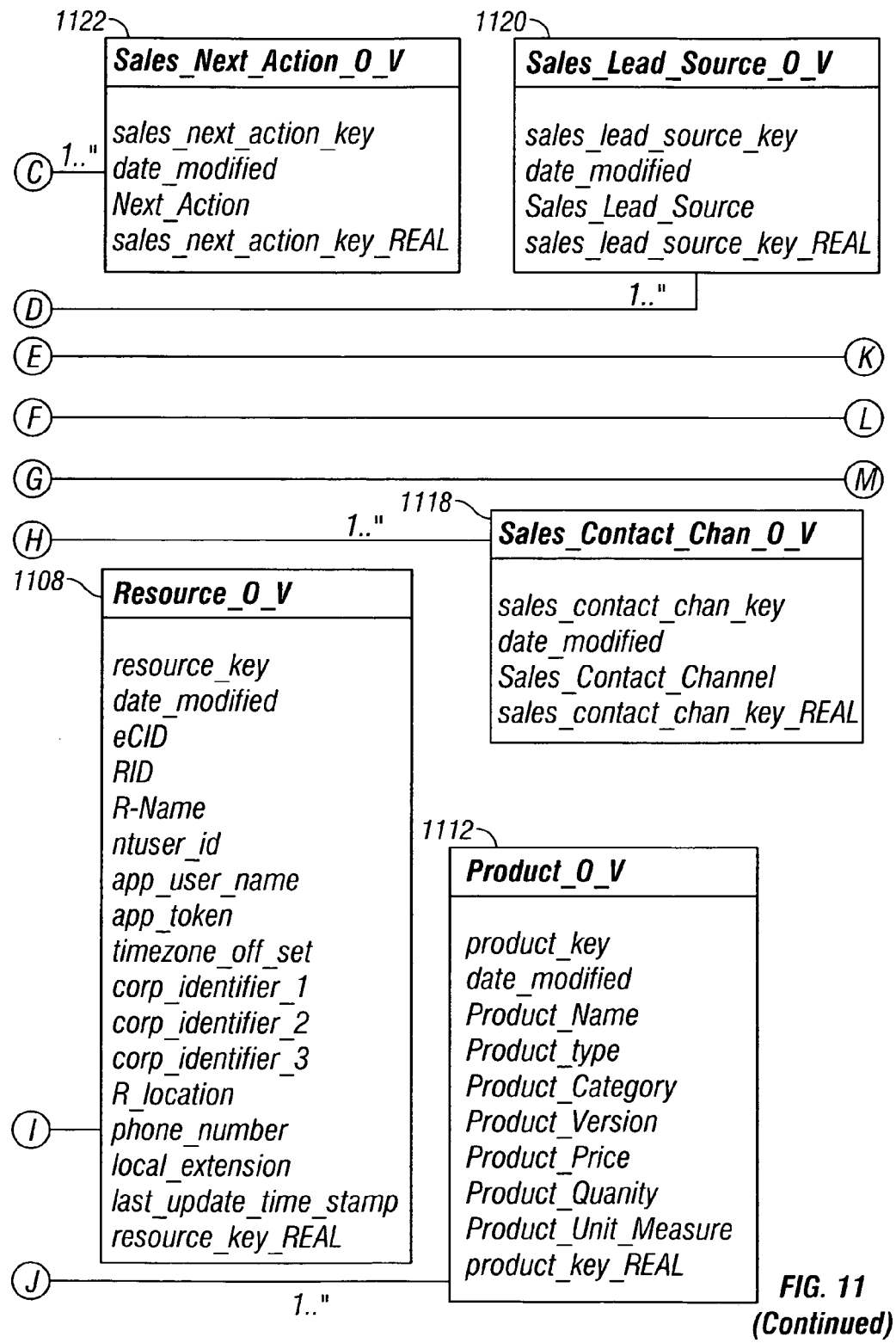
Figure 11:
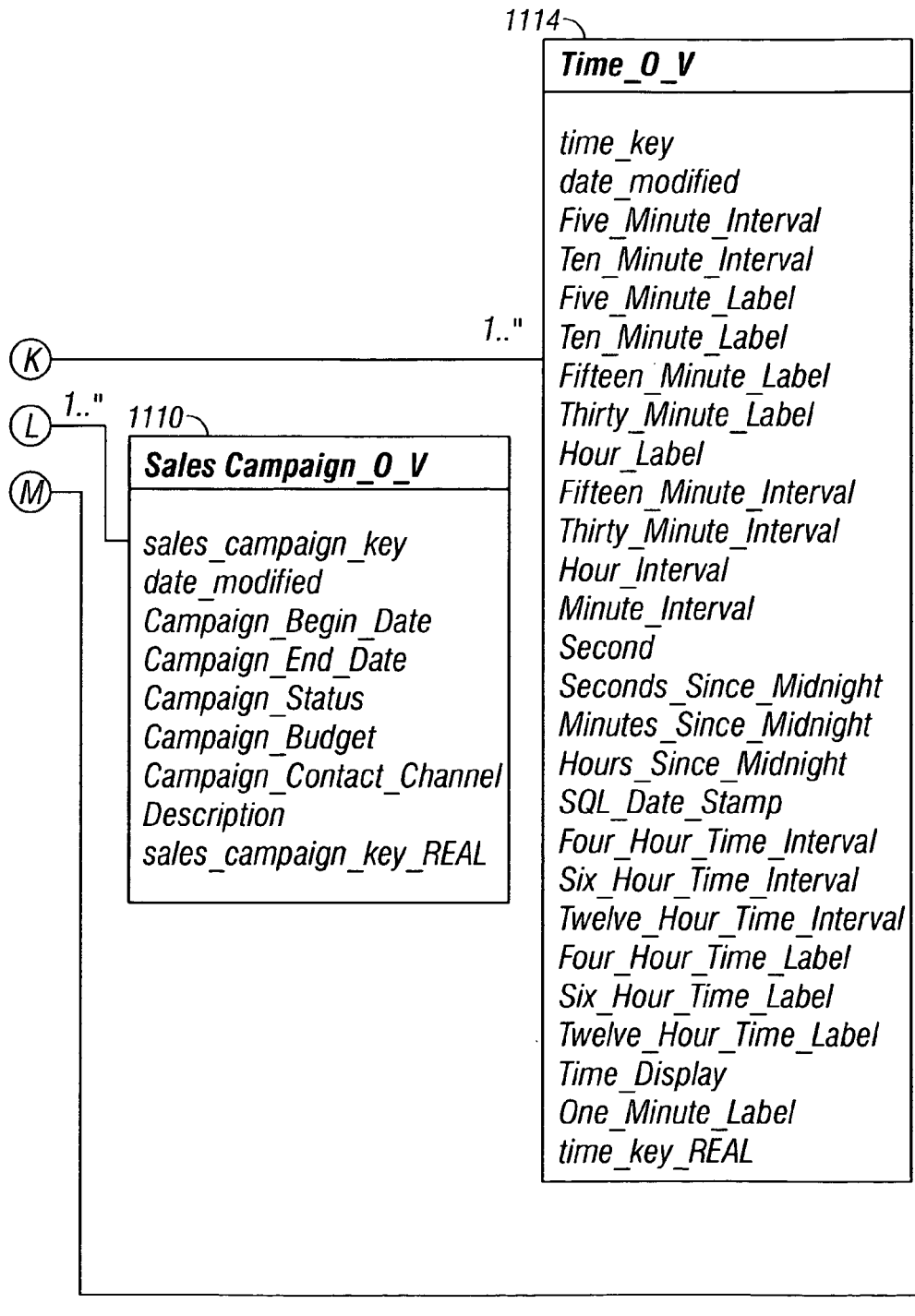
Figure 11:
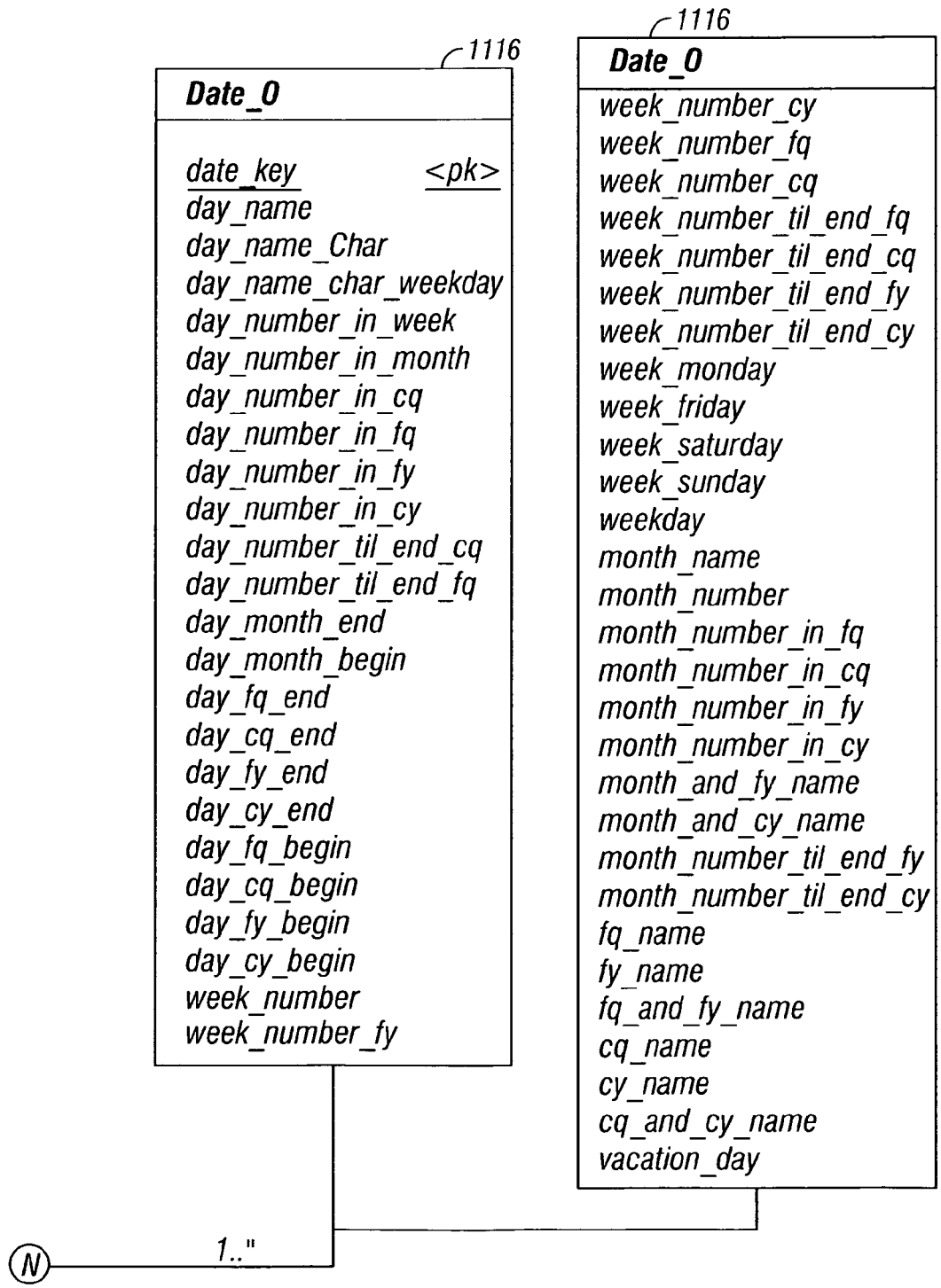

FIG. 11 illustrates a seventh central fact table 1100 containing data and a seventh set of attributes describing sales offers which may be directed to customers which have conducted communications received through said communications channels, said seventh set of attributes drawing from eleven dimension tables 1102–1122 containing data describing the time of the communication 1114, the date of the communication 1116, the entity receiving the communication from the customer (1102), the individual customer (1104), the business entity customer (1106), the resource entertaining the communication (1108), the product involved in the communication (1112), the sales campaign which could be initiated (1110), the source responsible for generating the sales lead (1120), the communications channel used to complete the sale (1118), and the next action needed to advance the sale (1122).

Figure 12:
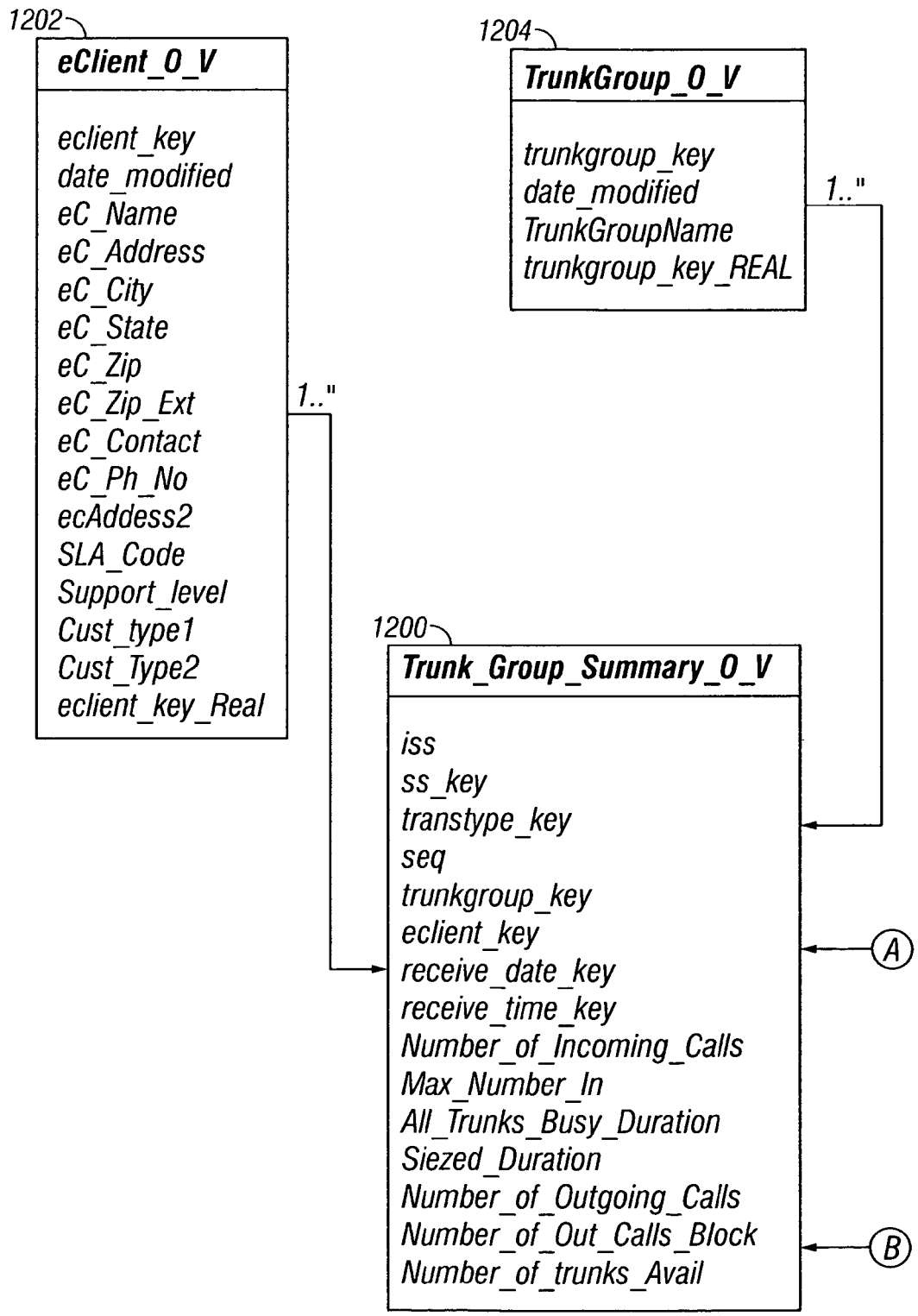
FIG. 12 is a block diagram of the star schema for storing information related to trunk groups of a business using the present invention
Figure 12:
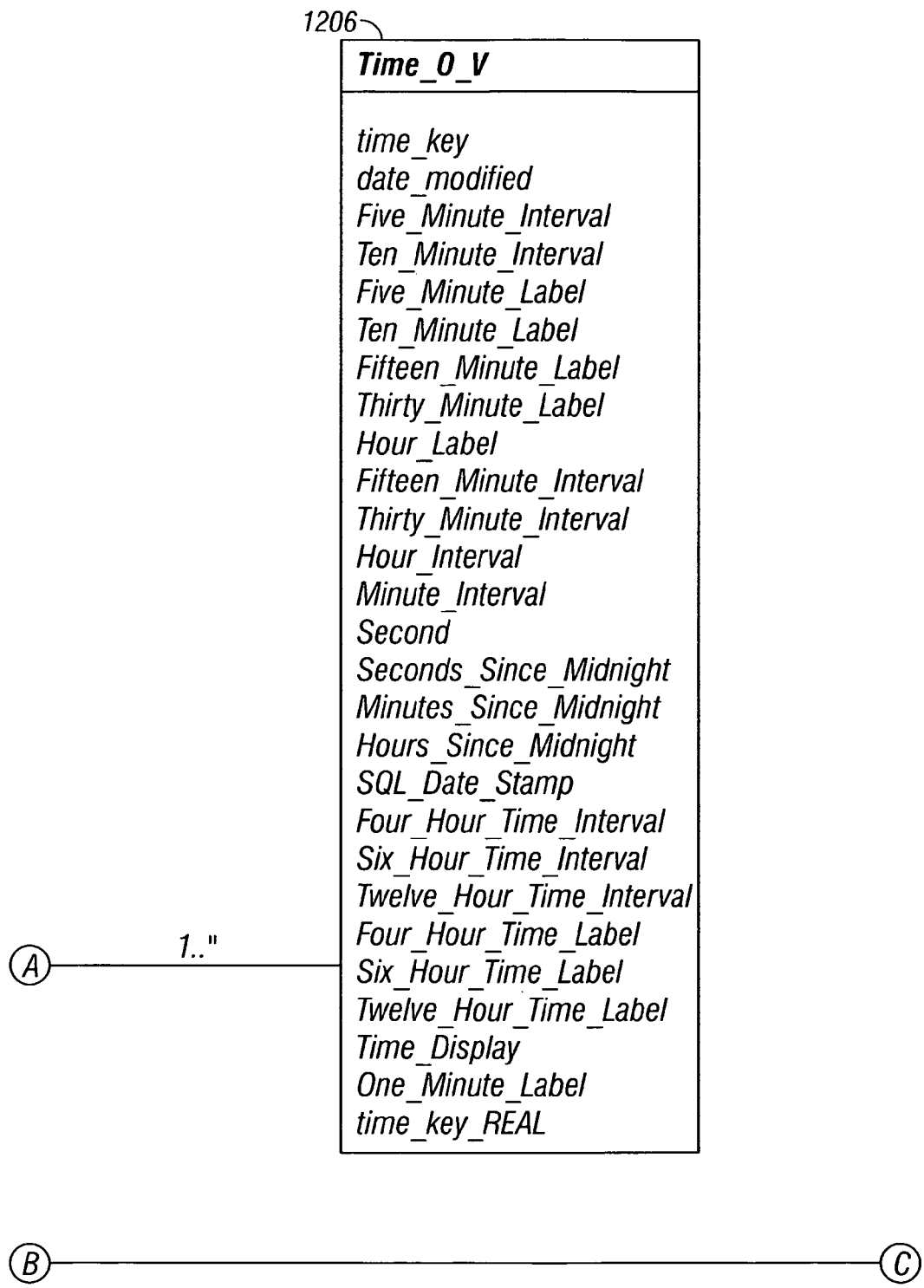
Figure 12:
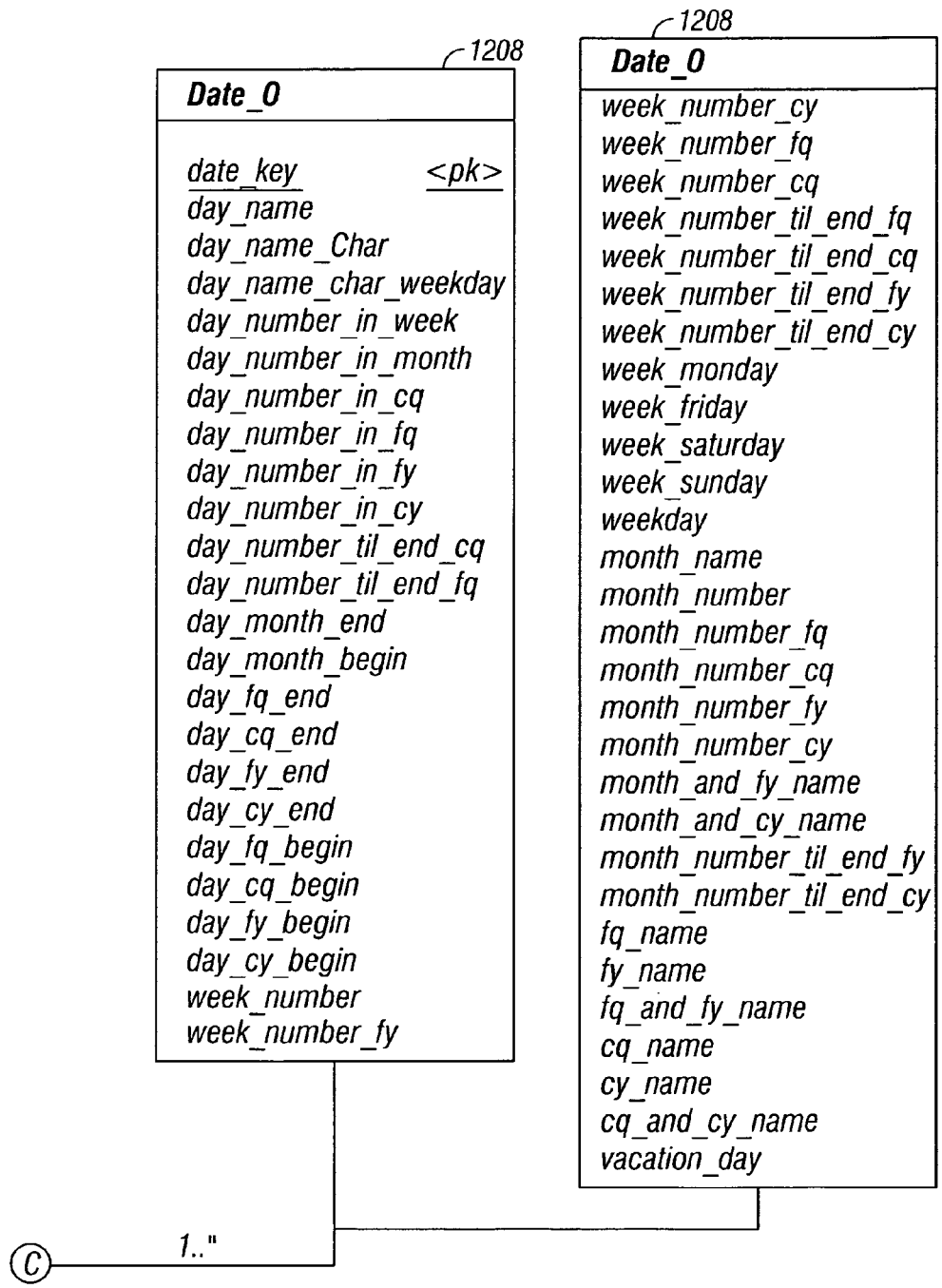

FIG. 12 illustrates an eighth central fact table 1200 containing data and an eighth set of attributes describing a trunk group available to receive communications through said communications channels, said eighth set of attributes drawing from four dimension tables 1202–1208 containing data describing the time of the communication (1206), the date of the communication (1208), the entity receiving the communication from the customer (1202), and the trunk group (1204).

Figure 13:
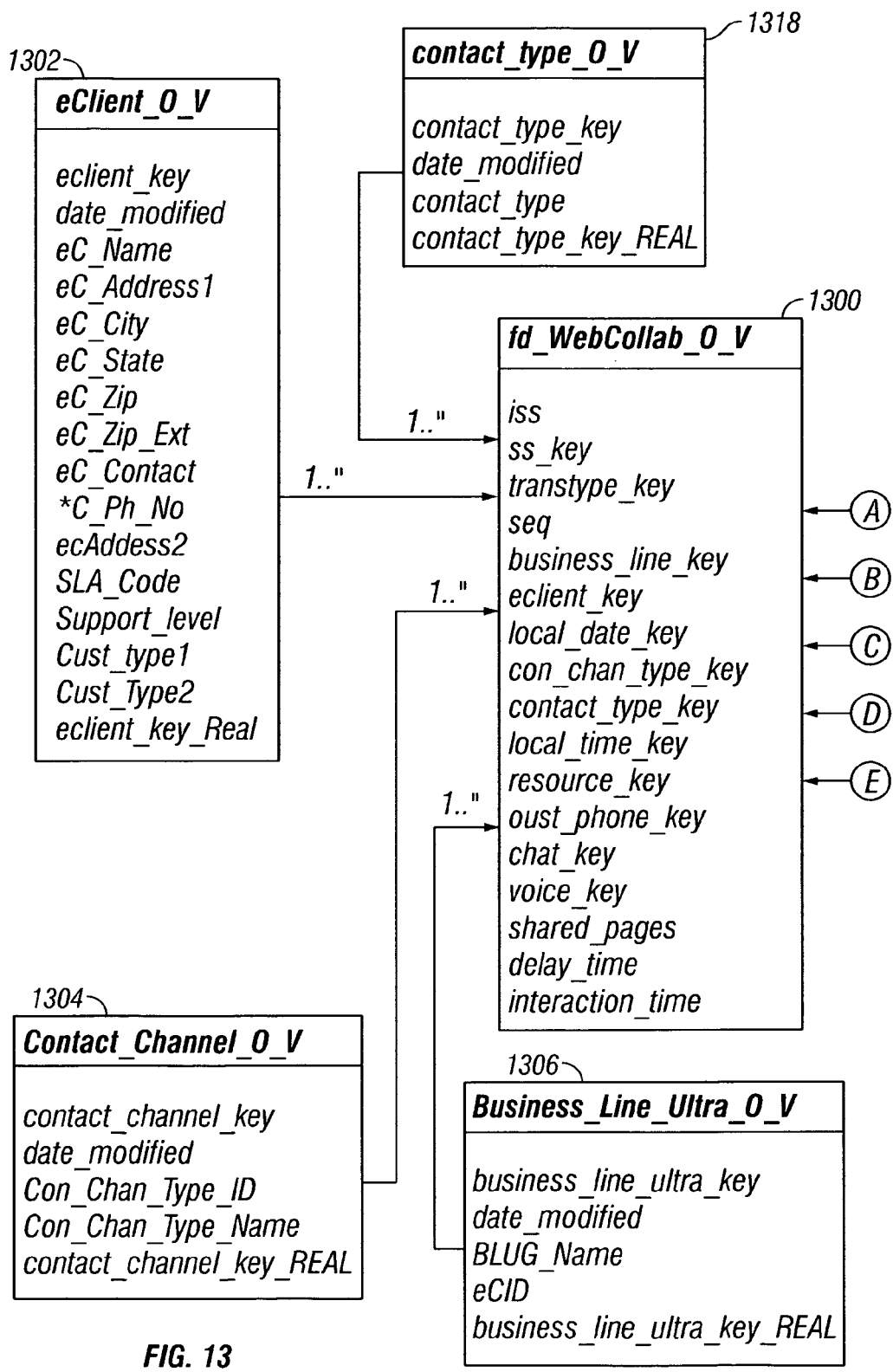
FIG. 13 is a block diagram of the star schema for storing information related to Web Collaboration experienced by a business using the present invention.
Figure 13:
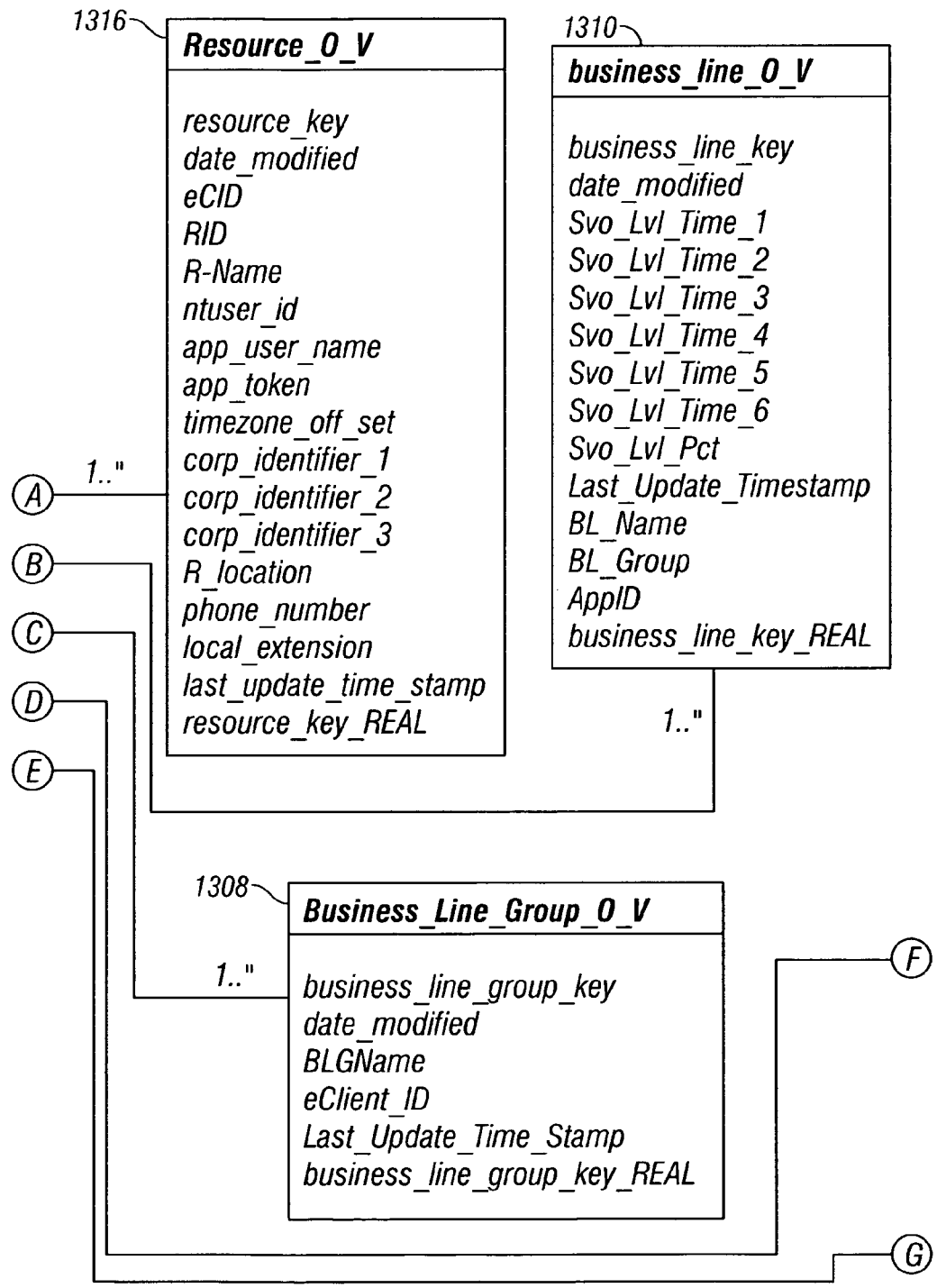
Figure 13:
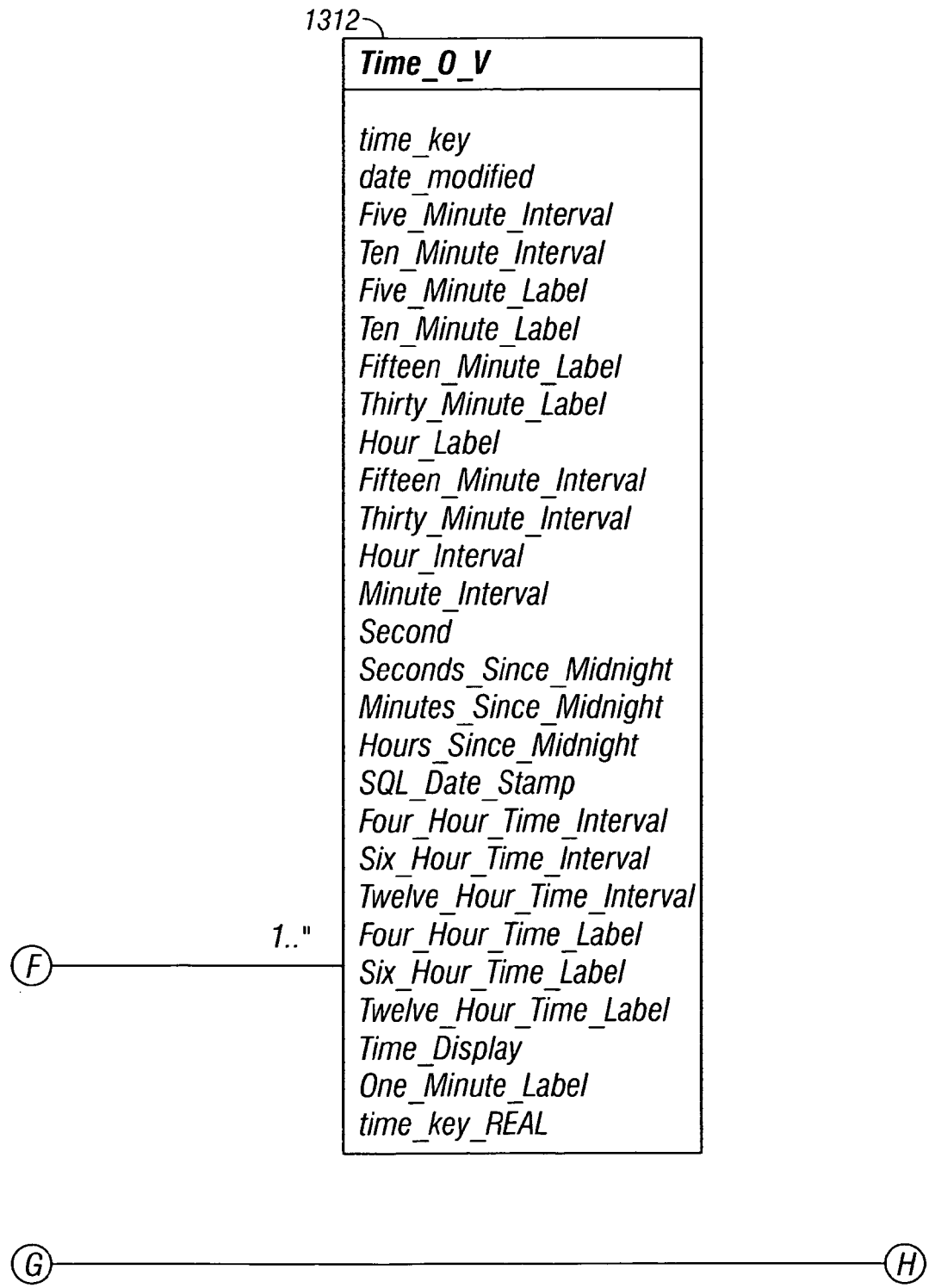
Figure 13:
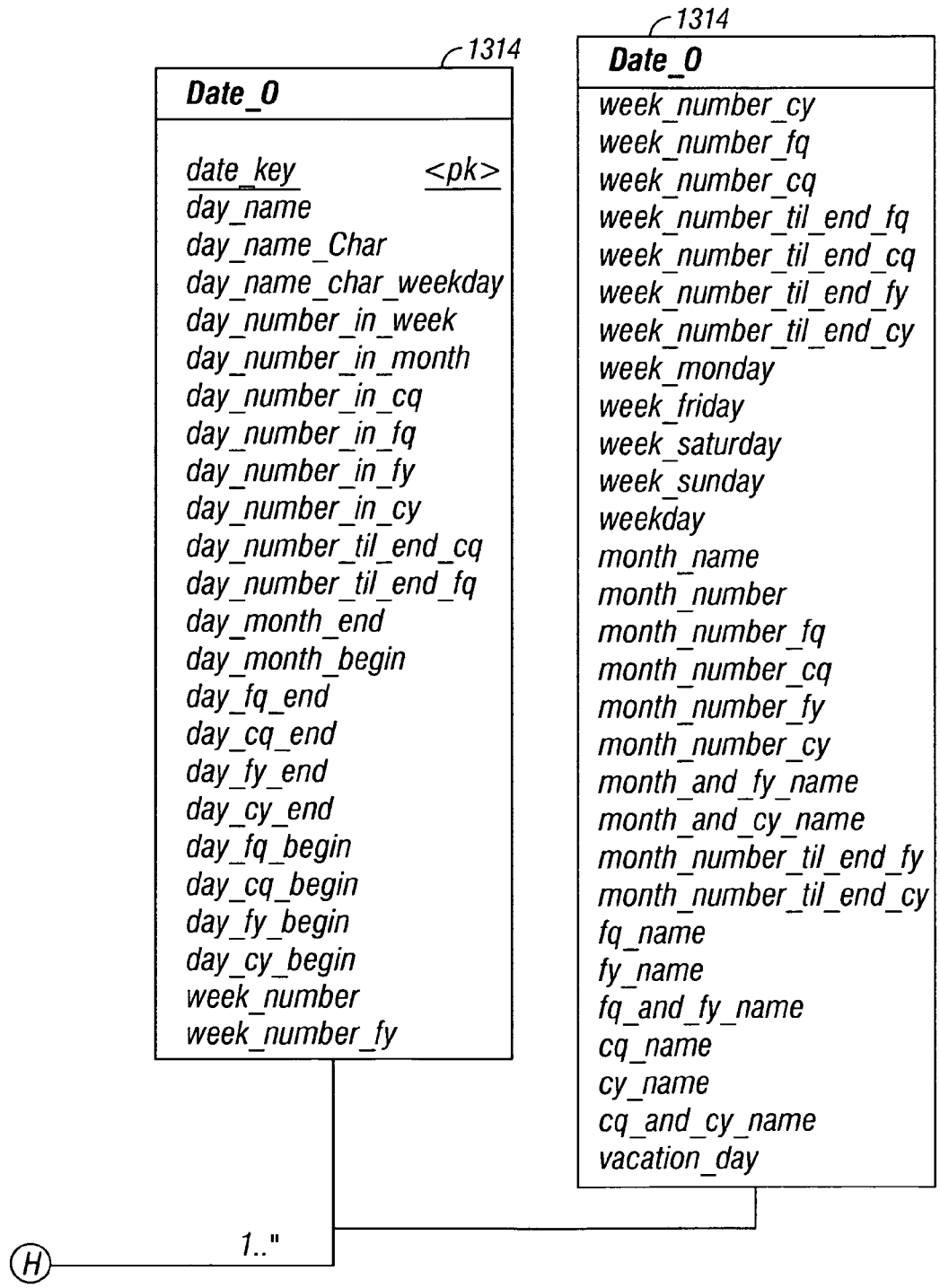

FIG. 13 illustrates a ninth central fact table 1300 containing data and a ninth set of attributes describing interactive computer network communications received through said communications channels, said ninth set of attributes drawing from nine dimension tables 1302–1318 data describing the time of the communication (1312), the date of the communication (1314), the entity receiving the communication from the customer (1302), the resource entertaining the communication (1316), the channel through which the communication was received (1304), the type of communication received (1318), the business line responsible for the subject of the communication (1310), the business line group responsible for the subject of the communication (1308), and the business line ultra group responsible for the subject of the communication (1306).

Figure 14:
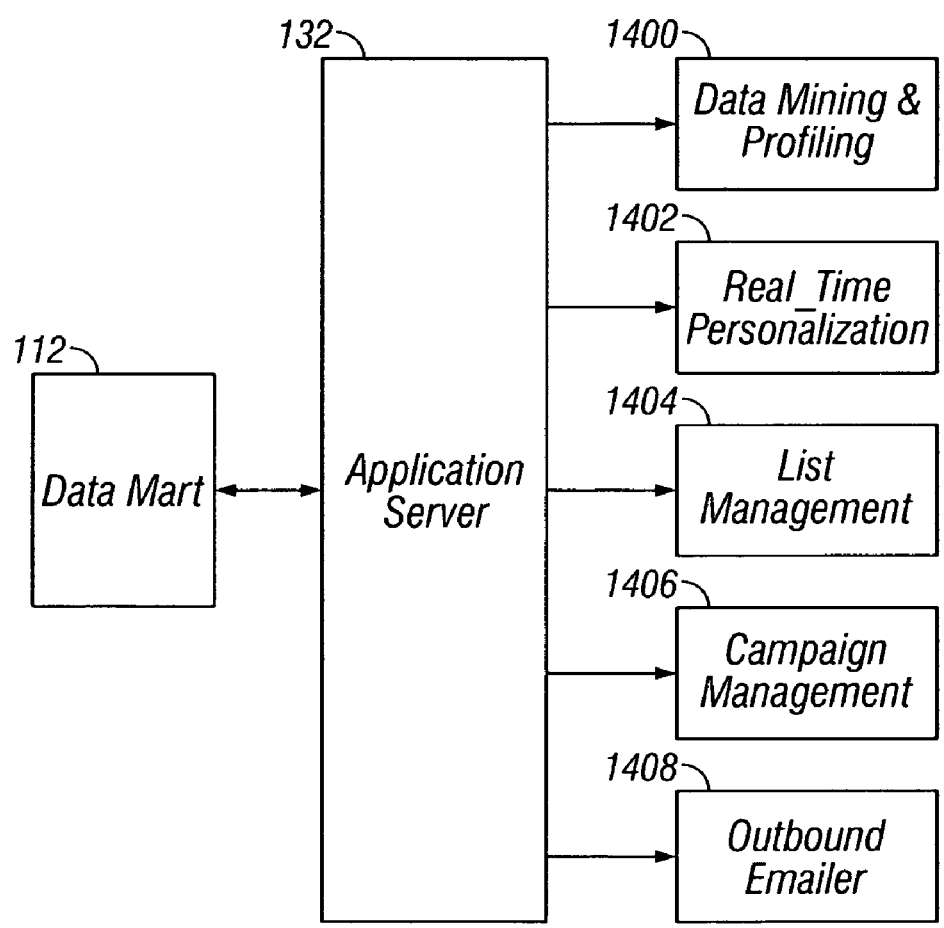
FIG. 14 is a schematic diagram of the data analysis software modules integrated with the present invention.

The data model 112 also interacts with the various analytical tools that are stored on the application server 132. FIG. 14 illustrates the potential activities of such an application server 132. On-Line Application Processing software (OLAP) interacts with data stored in the data model 112 to provide a variety of analytical services 1400–1408 for end users, e.g., User A 134, User B 136, and User C 138 (see FIG. 3). For example, Data Mining applications 1400 enable users to study, plan and organize business activities by viewing select aspects of unified historical data, reported in conformance with user-selected limits on numerous data variables; such as, for example, dates of contacts, channels of contacts, persons entertaining contacts, delay until service, duration of service, etc. In addition, the present invention enables users of the system to entertain customer contacts in the context of virtually instantaneous access to information 1402 culled from that customers' past contacts through the variety of considered contact channels.

One of the advantages of the present invention is that users of the system can use data analysis to identify critical trends in the way their business is being operated. For example, if a business suddenly recognizes a migration from e-mail to web contacts, the business can dynamically begin to manage the manner in which the business accommodates its contacts. In this case, the business may want to purchase additional hardware so that it can support web contacts. This can be done in a dynamic manner before a web server crashes as a result of overloading at the server. Further, the business can train its personnel, in this case, to deal with customers via web contacts, while at the same time reducing the resources devoted to entertaining the dwindling number of e-mail contacts.

Further, the present invention adapts the campaign management functions 1406 of the E.piphany software to perform campaigns. In this connection, the ability to analyze unified data from an integrated system allows users of the present invention to conduct focused business management and development campaigns. For example, a campaign may attempt to switch business from the telephone contact channel 126 over to the web contact channel 118, or to the e-mail contact channel 122, by, for example, sending e-mail, to customers known to use the telephone contact channel 126, about the availability of the e-mail contact channel 122 or about special product offers available only through the e-mail contact channel 122 (see FIG. 3).

Further, the present invention adapts the list management functions 1404 of the E.piphany software to generate lists of customers based upon various interests of those customers. The list management software 1404 can be used in combination with the campaign management functions 1406 to contact those customers having an interest in a particular area. Depending on the implementation, the information can be provided on a nearly real time basis. In this manner, campaigns can be generated very quickly through analysis of the data. In order to achieve the results supplied by the present invention, numerous reports would have to be generated for each separate database and these reports would have to be compared against one another to generate new spreadsheets that provide the data.

One aspect of the present invention is its ability to provide nearly instantaneous information concerning the nature of contacts, providing strategic business advantages. Another advantage of the present invention is the provision of a variety of data management tools using the unified data from the DataMart's database. The invention provides the ability to utilize such data management tools, classified into three general classes denominated Standard OLAP Reports, Business Analytics, and Real-Time Personalization 1402.

The first of these classes of reports, Standard OLAP Reports permits the user of the invention to generate data content reports in standardized formats, or in formats constructed according to the user's preferred selections of data types and parameters.

The second of the three classes, Business Analytics, permits the user of the invention to use the data stored in the DataMart's database in a variety of programs which analyze how the user's business has been conducted.

The third of the three classes, Real-Time Personalization 1402, permits the user of the invention to use the data stored in the DataMart's database to engage in dynamic business action. Such actions include product promotions and sales campaigns as well as instantaneous access to particular customer information as fresh contacts from that customer are entertained.

Other analysis application templates enable users to set parameters for select types of data and permit the included analysis software to comb the data model 112, pick out responsive data, apply analytic algorithms to the responsive data, and present the results in easily understood human-readable formats. Some specialized terms are used for grouping resources, business lines and contact channels.

Octane is a standard CRM program that is available from Epiphany. 1-3 is a standard ACD program. Webline is a standard web collaboration program. Kana is a standard e-mail program. Geotel is a standard pre-call routing program. One of the features of this invention, as implied by these terms, is that transactional data is being obtained and it is being married with CRM data to learn about the customers and their transactions.

Various fact and dimension tables which make up the star schema of the DataMart are disclosed in FIGS. 5 through 12. The fact and dimension tables specify the categories of information that is included in each such table as they are structured in the data model 112. For example, the business line dimension table (see, FIGS. 5, 9, and 13) has a series of attributes that describe a business line for which data can be obtained. In this example, a user of the system may wish to obtain data as to customer service for Visual Basic technical support. This can be accomplished through the application server 132, by selecting attributes from the business line dimension table. The business line dimension table provides a structure in the data model 112 that stores data so that this data can be retrieved according to the attributes that are listed in the business line. Many other dimension tables are disclosed in FIGS. 5 through 13. These dimension tables provide the basic overall structure of the data model. The data dimensions that are listed as attributes correspond to the stars of the star schema of the data model 112.

In other words, the data model 112 is established to have a series of different fact tables. Each one of these fact tables includes the attributes that are described in the table.

The present invention, therefore, comprises a unique manner of providing an integrated system that is capable of allowing a user to analyze its business through multi-dimensional data from various disparate contact channels that are used by customers to contact that business.

The foregoing description of the invention has been presented for purposes of illustration and description, It is not intended to be exclusive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A computer implemented system for processing and managing data generated by a plurality of customer communications received by a business through a plurality of diverse business communication channels, each communication channel comprising a computerized system including an interface for communication with individual or business entity customers and a records database for recording information concerning communications with individual or business entity customers, said system including:

a configuration component for instancing, in each of said records databases, specifications for data associated with each event involving a customer communication;

an extractor routine communicatively coupled with each of said contact records databases, said extractor routine extracts data concerning each event involving a customer communication from each of said contact records databases;

a transform routine communicatively coupled with said extractor routine, said transform routine receives data extracted by said extractor routine and transforms the data extracted by said extractor routine into data formatted according to an analysis protocol independent of protocols of said records databases;

a central database communicatively coupled with said transform routine, said central database is specially modeled on star schema, said central database receives and stores data transformed by said transform routine, storing said data in a specially modeled star schema; and an analysis server communicatively coupled with said central database, said analysis server accesses and synthesizes said data in response to inquiries concerning customer communication events and generates reports of the synthesis.

2. A computer implemented system for processing and managing data generated by a plurality of customer communications received by a business through a plurality of diverse business communication channels, each communication channel comprising a computerized system including an interface for communication with individual or business entity customers and a records database for recording information concerning communications with individual or business entity customers, as recited in claim 1, wherein the star schema of the central database comprises nine central fact tables comprising:

a first central fact table containing data and a first set of attributes describing customer communications received through said communication channels, said first set of attributes drawing from ten dimension tables data describing;
the time of the communication,
the date of the communication,
the entity receiving the communication from the customer,
the individual customer,
the business entity customer,
the resource entertaining the communication,
the channel through which the communication was received,
the business line responsible for the subject of the communication, the business line group responsible for the subject of the communication,
the business line ultra group responsible for the subject of the communication;

a second central fact table containing data and a second set of attributes describing cases opened in response to customer communications received through said communication channels, said second set of attributes drawing from eleven dimension tables data describing;
the entity receiving the communication,
the individual customer,
the business entity customer,
the date of the communication,
the time of the communication,
the resource entertaining the communication,
the channel through which the communication was received,
the subject of the communication,
the subject area in which the communication is categorized,
the priority of the communication,
the product involved in the communication;

a third central fact table containing data and a third set of attributes describing resources which entertain customer communications received through said communication channels, said third set of attributes drawing from six dimension tables data describing;
the entity receiving the communication,
the date of the communication,
the time of the communication,
the resource entertaining the communication,
the channel through which the communication was received,
the type of communication received;
a fourth central tact table containing data and a fourth set of attributes describing summaries of contacts received through said communications channels, said fourth set of attributes further drawing from nine dimension tables data describing;
the time of the communication,
the date of the communication,
the entity receiving the communication from the third party,
the channel through which the communication was received,
the type of contact received,
the business line responsible for the subject of the communication,
the business line group responsible for the subject of the communication,
the business line ultra group responsible for the subject of the communication,
the vendor supplying product;
a fifth central fact table containing data and a fifth set of attributes describing the state of the resources entertaining contacts received through said communications channels, said fifth set of attributes drawing from three dimension tables data describing
the time of the communication,
the date of the communication,
the resource entertaining the communication;
a sixth central fact table containing data and sixth attributes describing email messaging transmitted through said communications channels, said sixth set of attributes drawing from five dimension tables data concerning;
the time of the communication,
the date of the communication,
the category of the communication,
the status of the communication,
the folder in which the communication is stored;
a seventh central fact table containing data and seventh set of attributes describing sales offers which may be directed to customers which have conducted communications received through said communications channels, said seventh set of attributes drawing from eleven dimension tables data describing;
the time of the communication,
the date of the communication,
the entity receiving the communication from the customer,
the individual customer,
the business entity customer,
the resource entertaining the communication,
the product involved in the communication,
the sales campaign which could be initiated,
the source responsible for generating the sales lead,
the communications channel used to complete the sale,
the next action needed to advance the sale;
an eighth central fact table containing data and an eighth set of attributes describing trunk group available to received communications through said communications channels, said eighth set of attributes drawing from four dimension tables data describing;
the time of the communication,
the date of the communication,
the entity receiving the communication from the customer,
the trunk group,
a ninth central fact table containing data and a ninth set of attributes describing interactive computer network communications received through said communications channels, said ninth set of attributes drawing from nine dimension tables data describing;
the time of the communication,
the date of the communication,
the entity receiving the communication from the customer,
the resource entertaining the communication,
the channel through which the communication was received,
the type of communication received,
the business line responsible for the subject of the communication,
the business line group responsible for the subject of the communication,
the business line ultra group responsible for the subject of the communication.

3. A method in a computer system including routines for extraction of source data from a communication contact system, transformation of said data into a standardized format, loading the data in standardized format into a dynamic storage medium, and accessing the data in standardized format for purposes of analysis comprising:
defining specifications for data;
imposing the specifications on one or more communication contact systems;
collecting in said communication contact systems, data complying with the specifications;
extracting from each of the communication contact system all data complying with the specifications;
transforming all extracted data to transformed data in a standardized format;
storing all transformed data in defined logical tables in a single database;
accessing the transformed data from the single database;
processing the transformed data according to inquiries by end users;
transmitting the results of the processing to end users.

* * * * *